(12) United States Patent
Kaiya et al.

(10) Patent No.: US 8,275,958 B2
(45) Date of Patent: Sep. 25, 2012

(54) STORAGE SYSTEM WITH REMOTE COPY CONTROLLERS

(75) Inventors: Keiichi Kaiya, Hadano (JP); Toru Suzuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 623 days.

(21) Appl. No.: 12/526,662

(22) PCT Filed: Mar. 19, 2009

(86) PCT No.: PCT/JP2009/001235
§ 371 (c)(1),
(2), (4) Date: Aug. 11, 2009

(87) PCT Pub. No.: WO2010/106579
PCT Pub. Date: Sep. 23, 2010

(65) Prior Publication Data
US 2011/0264876 A1    Oct. 27, 2011

(51) Int. Cl.
*G06F 12/16* (2006.01)
(52) U.S. Cl. ............... 711/162; 711/170; 711/E12.103; 714/6.3; 714/E11.084
(58) Field of Classification Search ................ None
See application file for complete search history.

(56) References Cited

U.S. PATENT DOCUMENTS

| 5,889,935 A | 3/1999 | Ofek et al. |
| 2002/0133735 A1 | 9/2002 | McKean et al. |
| 2006/0224851 A1 | 10/2006 | Tamura et al. |
| 2006/0242363 A1 | 10/2006 | Tamura et al. |
| 2007/0055840 A1 | 3/2007 | Yamamoto et al. |
| 2008/0104443 A1 | 5/2008 | Akutsu et al. |
| 2008/0229039 A1 | 9/2008 | Maki et al. |
| 2008/0270695 A1 | 10/2008 | Ninose |
| 2011/0066801 A1 | 3/2011 | Sato |

FOREIGN PATENT DOCUMENTS

| EP | 2 009 550 A1 | 12/2008 |
| JP | 9-81431 A | 3/1997 |
| JP | 2005-107645 A | 4/2005 |
| JP | 2006-285876 A | 10/2006 |
| JP | 2007-72538 A | 3/2007 |
| JP | 2008-134988 A | 6/2008 |
| JP | 2008-225753 A | 9/2008 |
| JP | 2012-504793 A | 2/2012 |

*Primary Examiner* — Kevin Verbrugge
(74) *Attorney, Agent, or Firm* — Mattingly & Malur, PC

(57) ABSTRACT

A storage system 1 includes a first storage apparatus 100 and a second storage apparatus 100 communicatively coupled to an external apparatus 300. The first and second storage apparatuses respectively have first and second storage areas VDEVs selectively accessible from the external apparatus, first and second temporary storage areas 113, and remote copy controllers 1122 configured to control data copy process. The storage system includes a data I/O process authority information storage unit LDK storing data I/O process authority information. Either of the remote copy controllers reads the data I/O process authority information and copies according to the data I/O process authority information, to the other storage apparatus, data stored either in the first storage area and the first temporary storage area, or in the second storage area and the second temporary storage area that are included in the storage apparatus to which the remote copy controller belongs.

15 Claims, 29 Drawing Sheets

[Fig. 1]
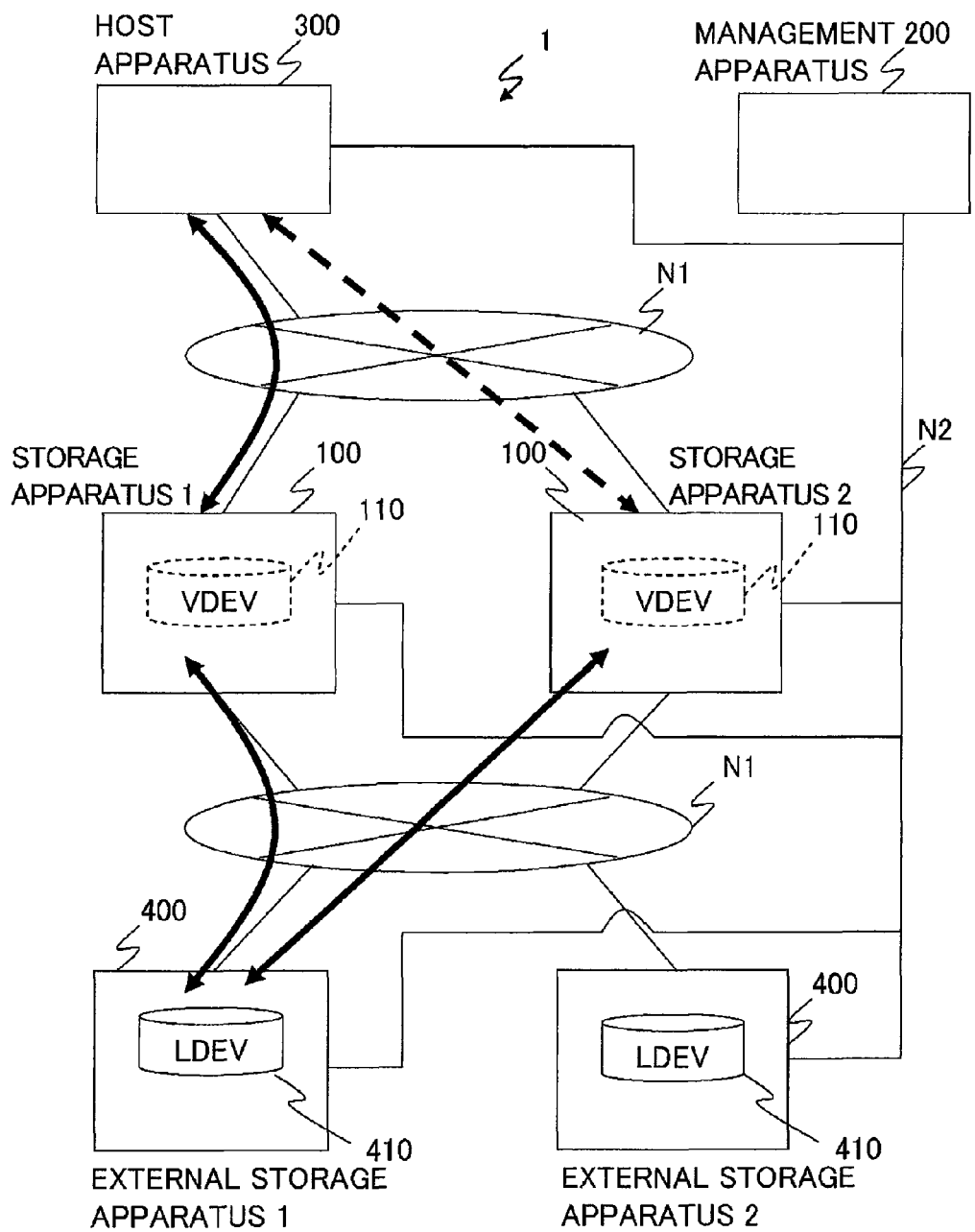

[Fig. 2]
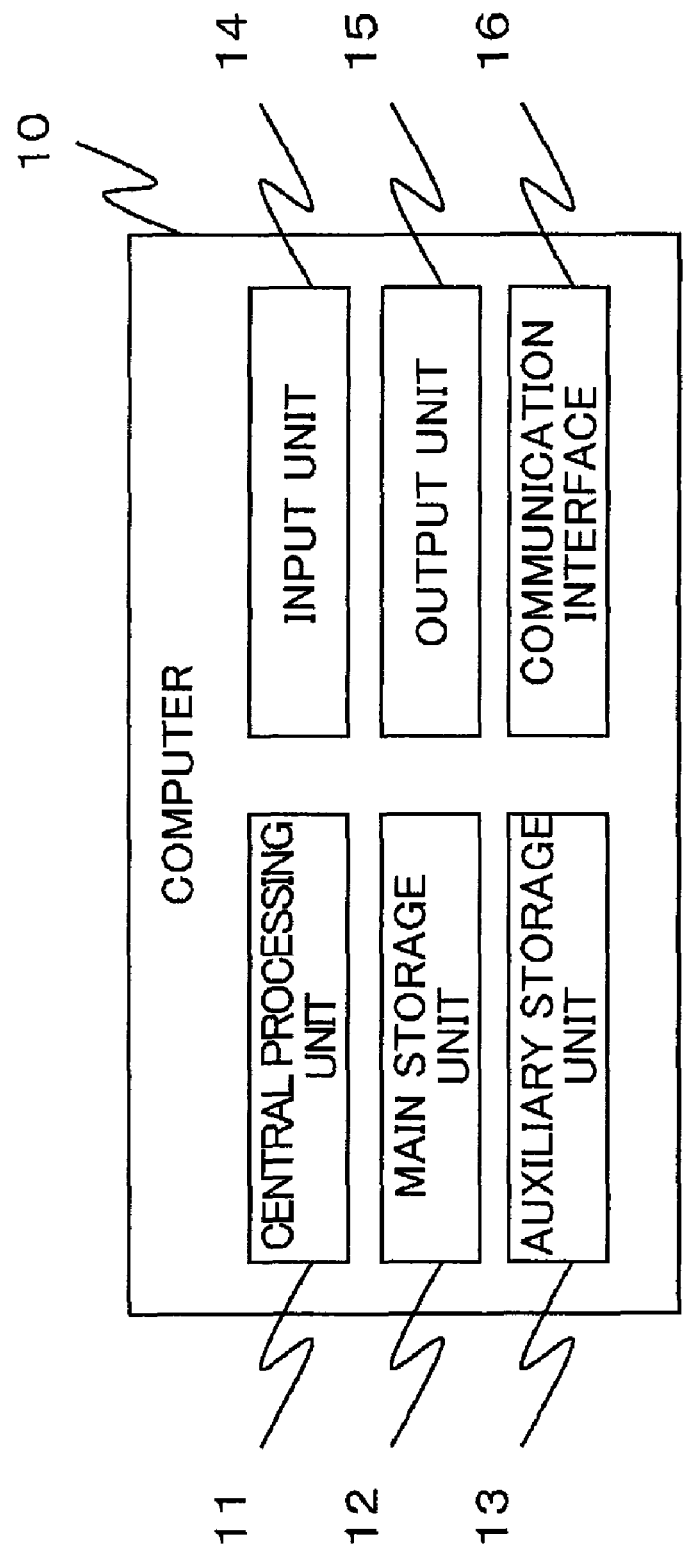

[Fig. 3]
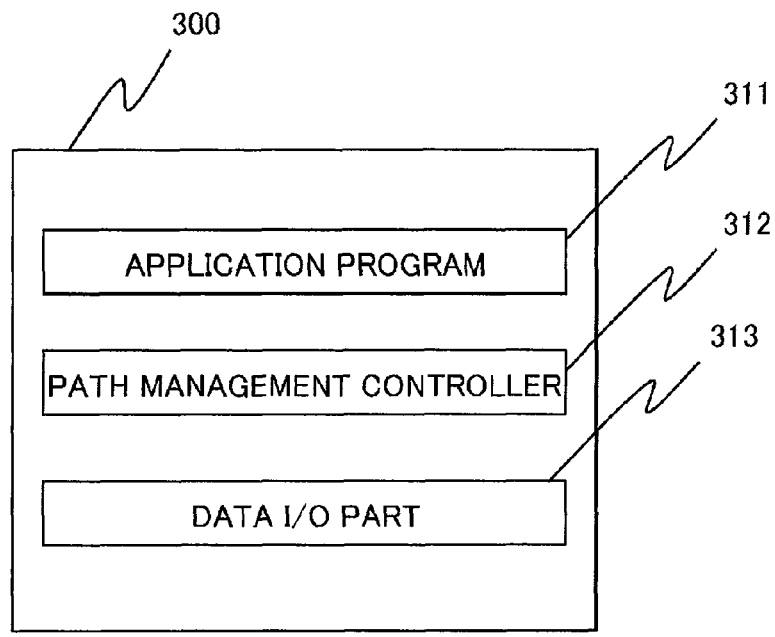
[Fig. 4]
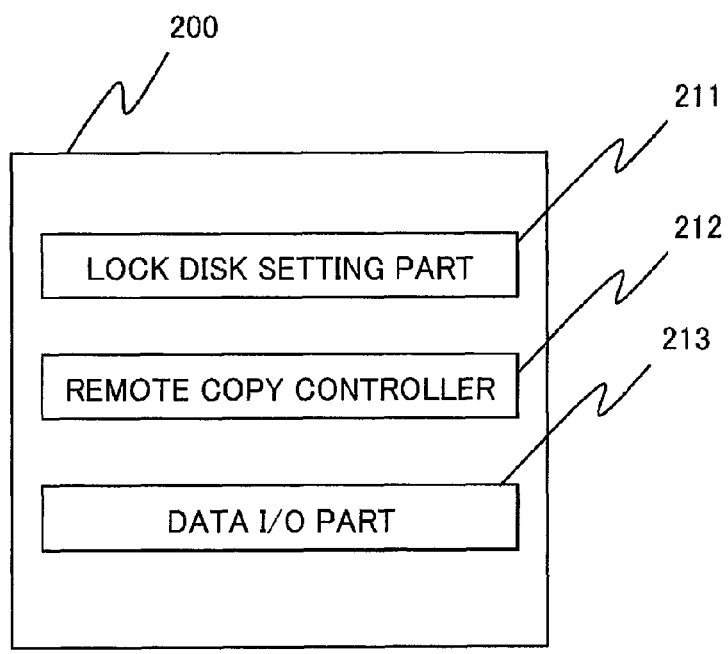

[Fig. 5]
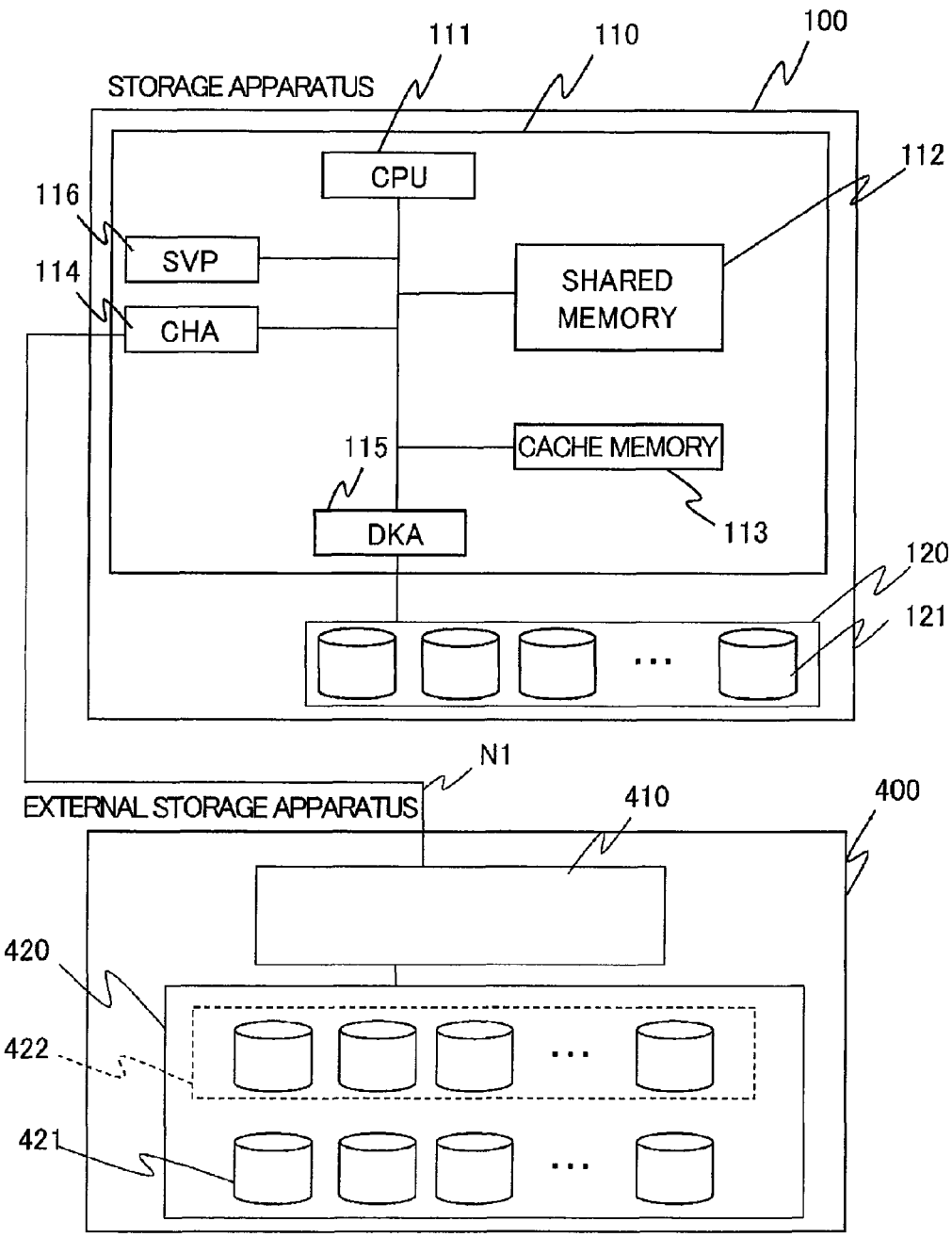

[Fig. 6]
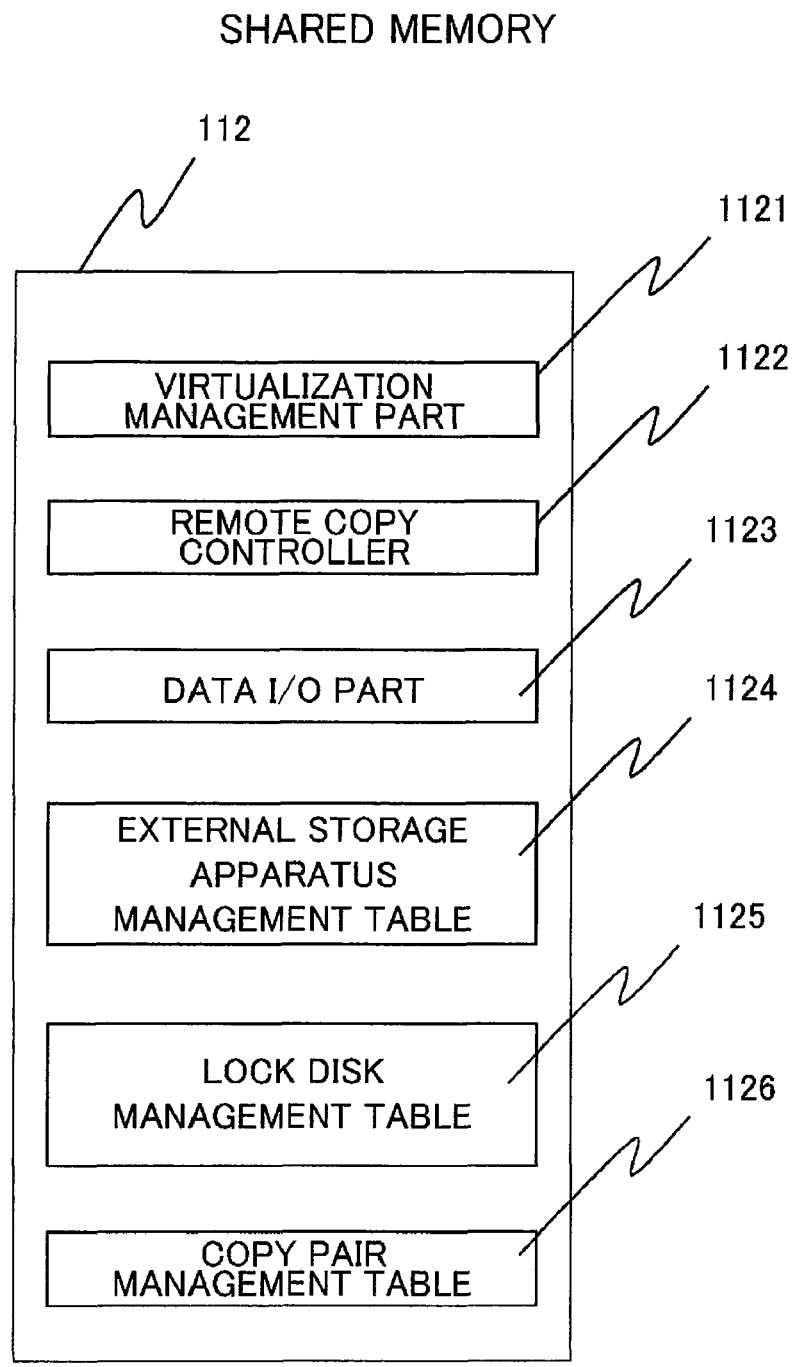

[Fig. 7]
STORAGE APPARATUS 100
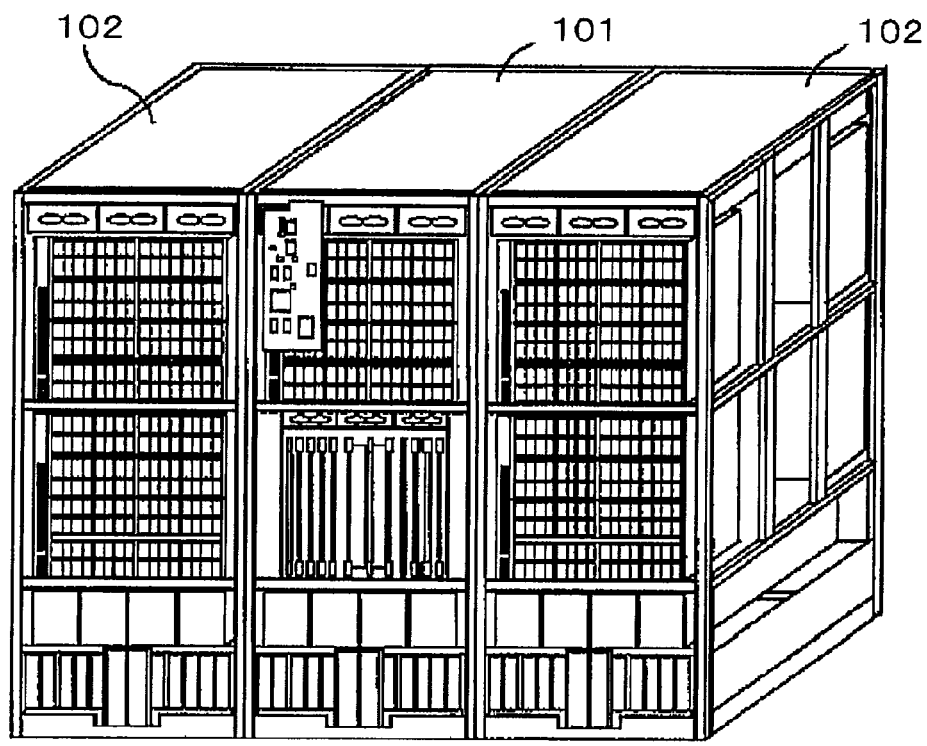

[Fig. 8]
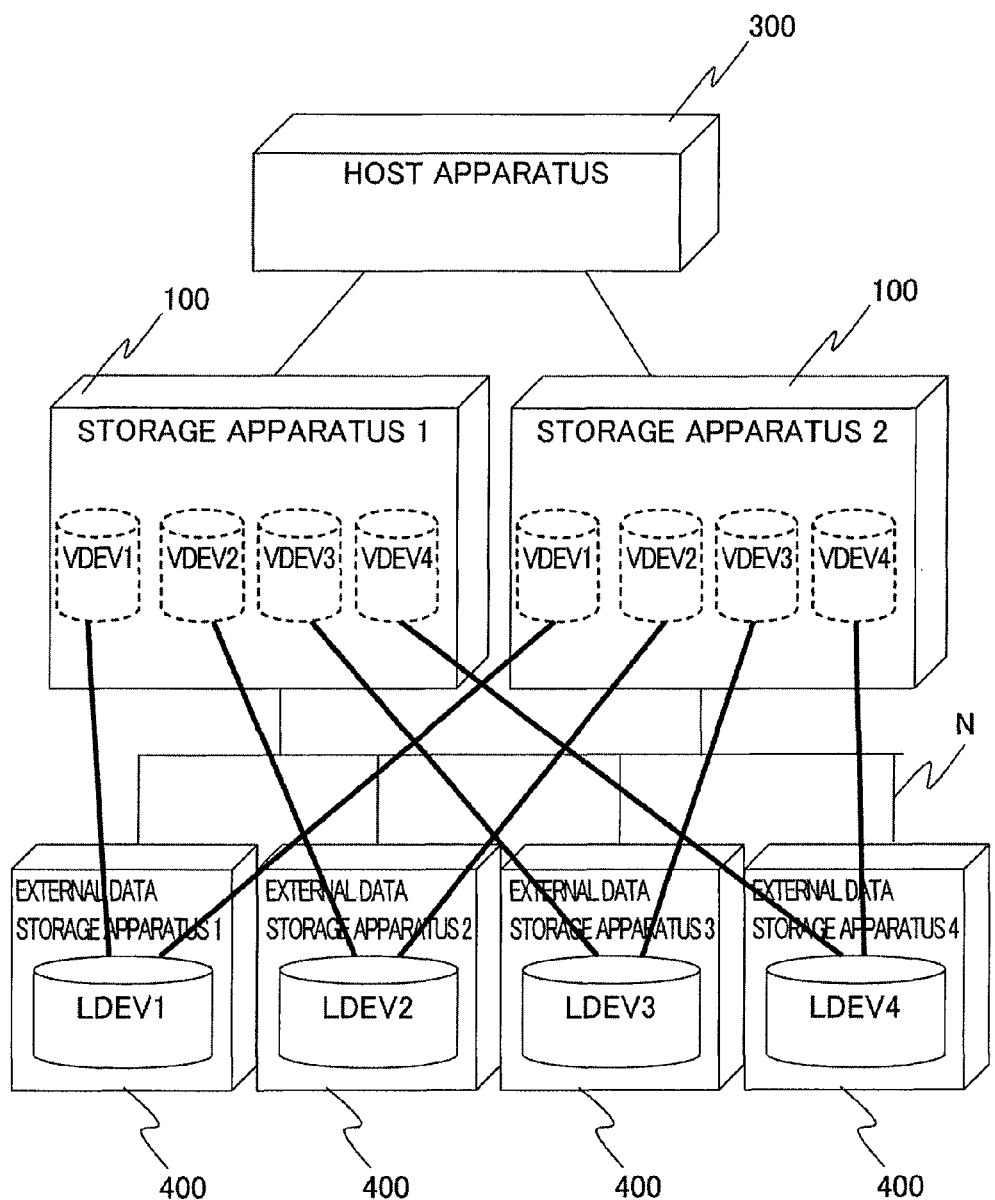

[Fig. 9]
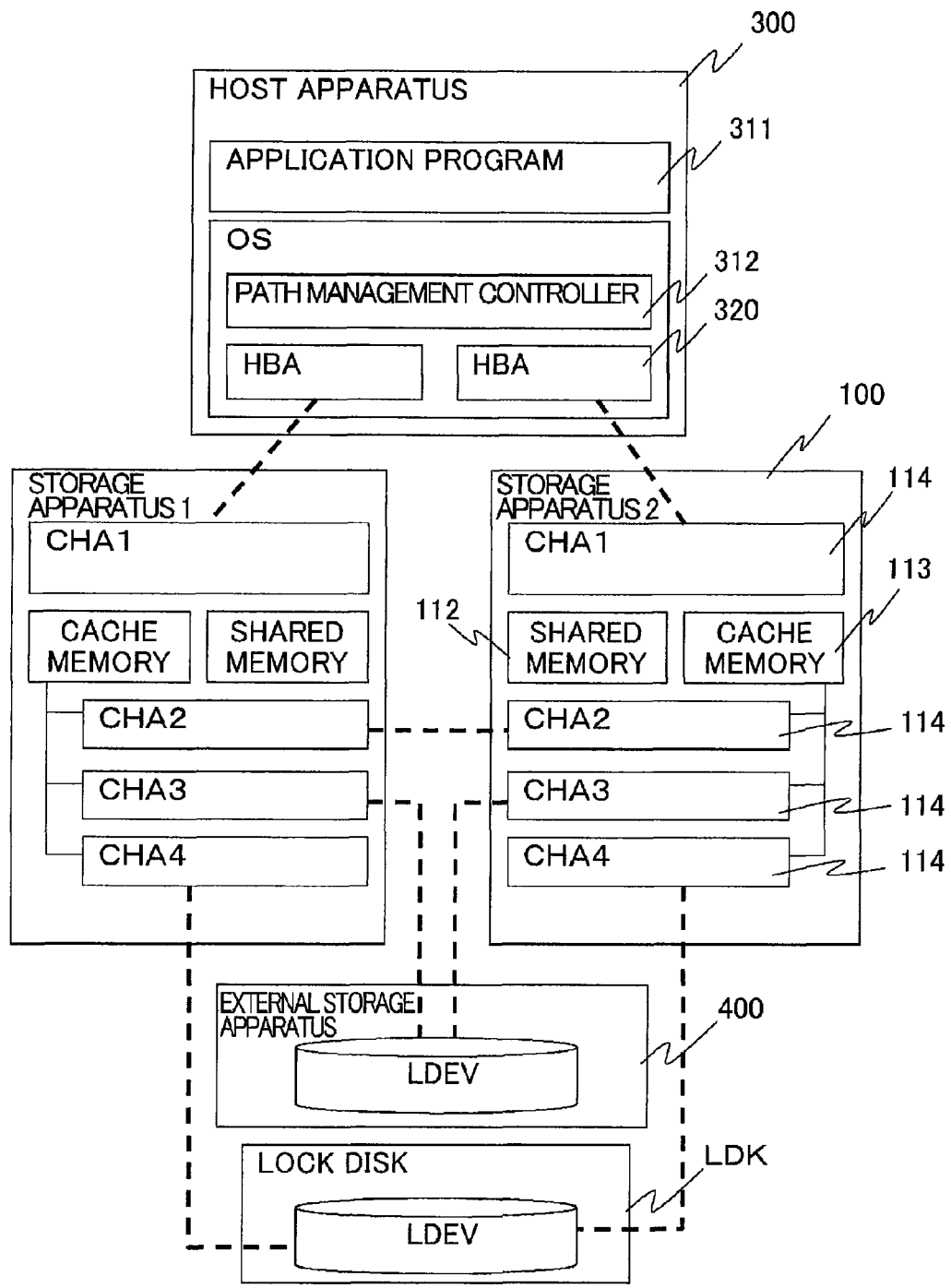

[Fig. 10]
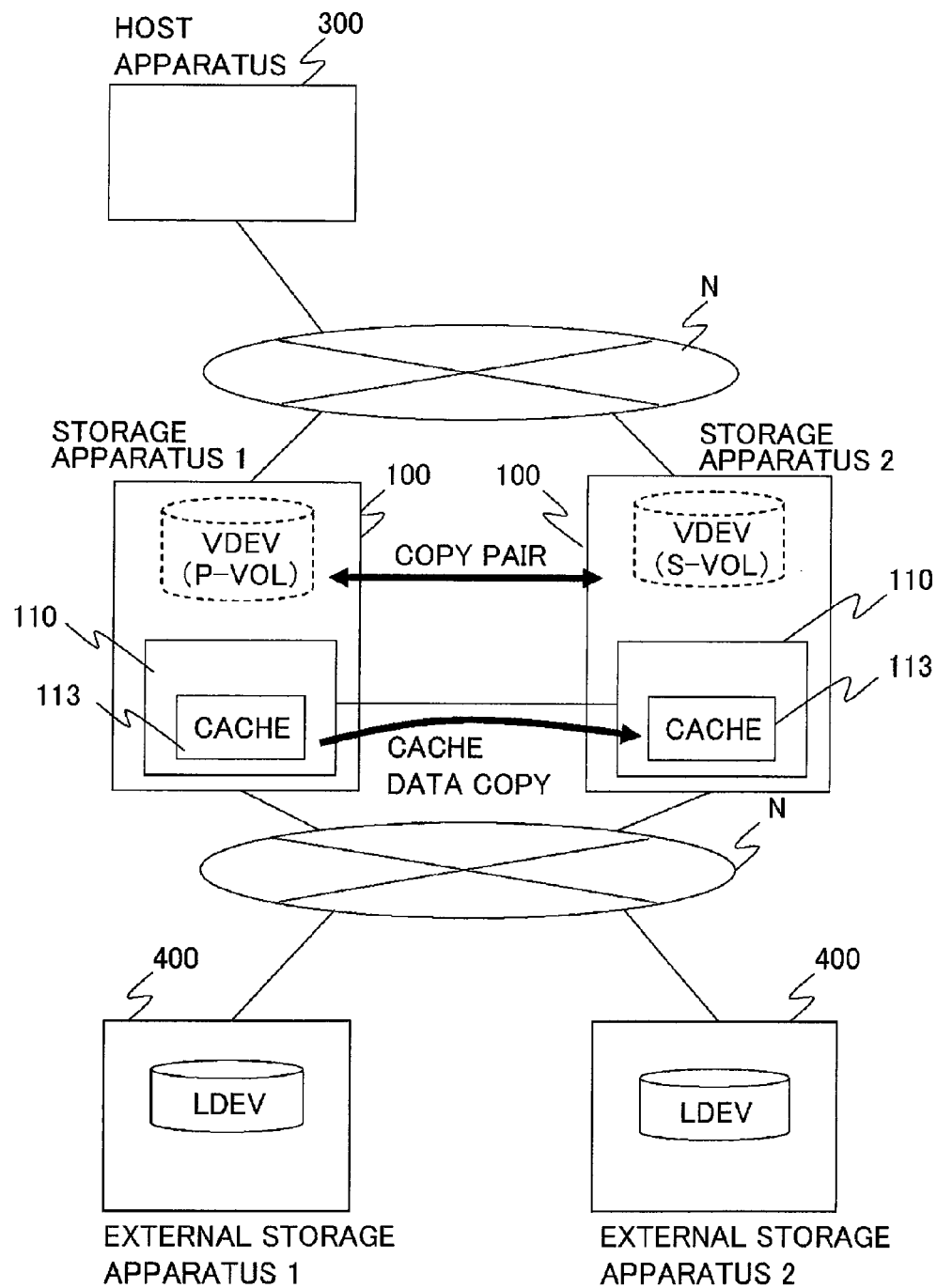

[Fig. 11]

RELATIONSHIP BETWEEN PAIR STATUS AND OWNERSHIP

| PAIR STATUS | OWNERSHIP | P-VOL | S-VOL |
|---|---|---|---|
| PAIR | P-VOL | I/O ENABLED | I/O ENABLED AFTER TRANSITION TO SSWS |
| FAILURE SUSPEND | P-VOL | I/O ENABLED | I/O DISABLED |
| SSWS | S-VOL | I/O DISABLED | I/O ENABLED |

[Fig. 12]
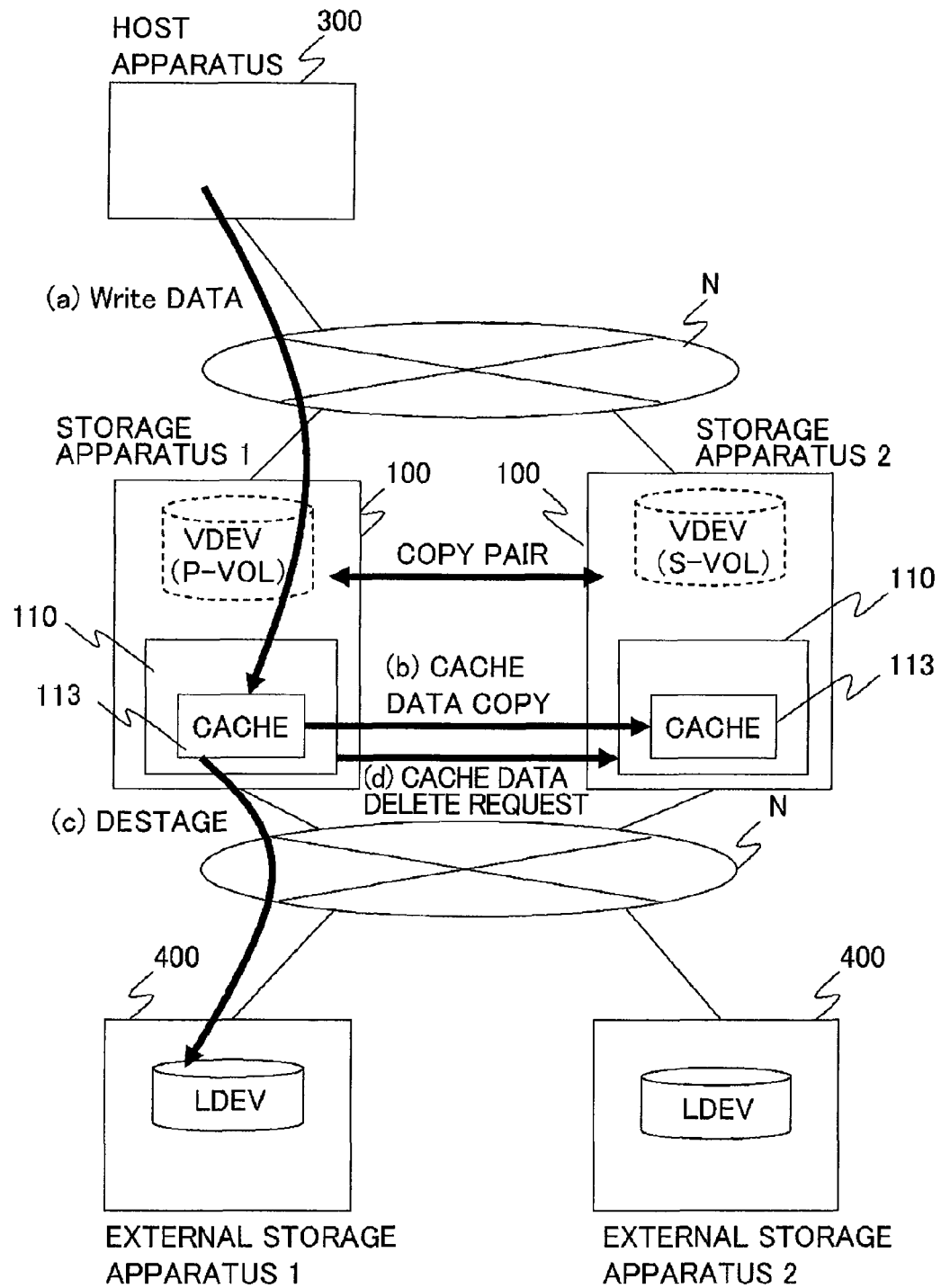

[Fig. 13]
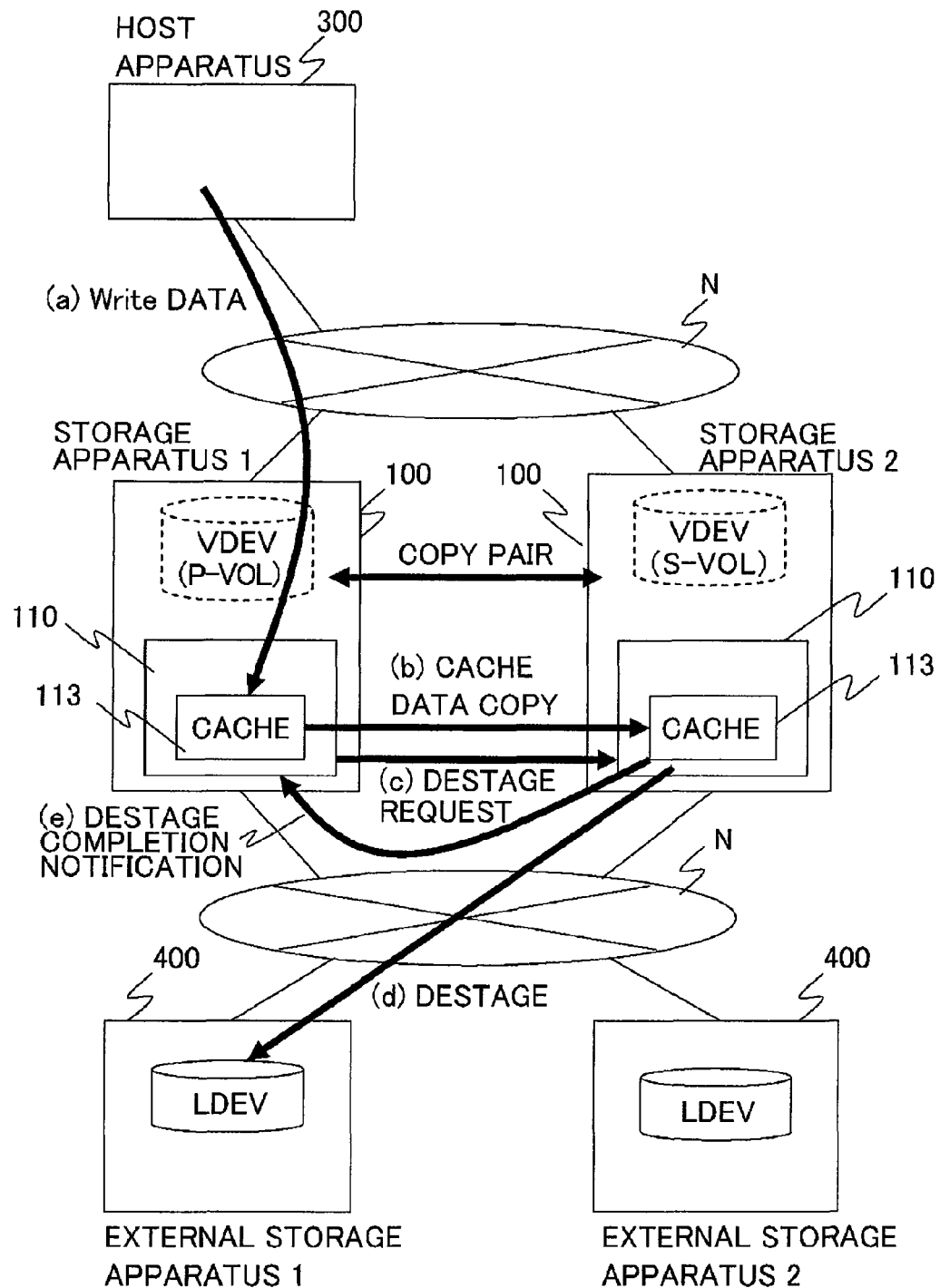

[Fig. 14]

EXTERNAL STORAGE APPARATUS MANAGEMENT TABLE (STORAGE APPARATUS 1) 1124

| SERIAL NUMBER | VENDOR NAME | APPARATUS NAME | LDEV IDENTIFICATION INFORMATION | LDEV CAPACITY | VDEV # | MANAGEMENT INFORMATION | PATH INFORMATION |
|---|---|---|---|---|---|---|---|
| 11234 | HITACHI | RAID | 0000 | 18000 | 0000 | | 1A- 50060e80042BE241<br>2A- 50060e80042BE242<br>1B- 50060e80042BE253<br>2B- 50060e80042BE254 |
| 11234 | HITACHI | RAID | 0010 | 200000 | 0001 | | 1A- 50060e80042BE241<br>2A- 50060e80042BE242<br>1B- 50060e80042BE253<br>2B- 50060e80042BE254 |
| 11234 | HITACHI | RAID | 0011 | 200000 | 0002 | | 1A- 50060e80042BE241<br>2A- 50060e80042BE242<br>1B- 50060e80042BE253<br>2B- 50060e80042BE254 |
| 11234 | HITACHI | RAID | 0012 | 200000 | 0003 | | 1A- 50060e80042BE241<br>2A- 50060e80042BE242<br>1B- 50060e80042BE253<br>2B- 50060e80042BE254 |
| AB555 | HITACHI | DF | 0001 | 2000 | 0010 | LOCK DISK 0x00 | 3A- 50060e8000427431<br>4A- 50060e8000427432 |

EXTERNAL STORAGE APPARATUS MANAGEMENT TABLE (STORAGE APPARATUS 2) 1124

| SERIAL NUMBER 11241 | VENDOR NAME 11242 | APPARATUS NAME 11243 | LDEV IDENTIFICATION INFORMATION 11244 | LDEV CAPACITY 11245 | VDEV # 11246 | MANAGEMENT INFORMATION 11247 | PATH INFORMATION 11248 |
|---|---|---|---|---|---|---|---|
| AB555 | HITACHI | DF | 0001 | 2000 | 1000 | LOCK DISK 0x00 | 1A-- 50060e8000427401<br>2A-- 50060e8000427402 |
| 11234 | HITACHI | RAID | 0000 | 18000 | 0750 | | 5C-- 50060e80042BE235<br>6C-- 50060e80042BE236<br>5D-- 50060e80042BE237<br>6D-- 50060e80042BE238 |
| 11234 | HITACHI | RAID | 0010 | 200000 | 0751 | | 5C-- 50060e80042BE235<br>6C-- 50060e80042BE236<br>5D-- 50060e80042BE237<br>6D-- 50060e80042BE238 |
| 11234 | HITACHI | RAID | 0011 | 200000 | 0752 | | 5C-- 50060e80042BE235<br>6C-- 50060e80042BE236<br>5D-- 50060e80042BE237<br>6D-- 50060e80042BE238 |
| 11234 | HITACHI | RAID | 0012 | 200000 | 0753 | | 5C-- 50060e80042BE235<br>6C-- 50060e80042BE236<br>5D-- 50060e80042BE237<br>6D-- 50060e80042BE238 |
| | | | | | | | |

[Fig. 16]

[Fig. 17]

LOCK DISK MANAGEMENT TABLE (STORAGE APPARATUS 2) 1125

| LOCK DISK ID 11251 | TABLE VALID/INVALID 11252 | OWN DKC S/N 11253 | PAIRED DKC S/N 11254 | OWN DKC LOCK INFORMATION 11255 |
|---|---|---|---|---|
| 0x00 | VALID | 64016 | 64036 | 0010······ |
| :: | INVALID | - | - | - |

[Fig. 18]

COPY PAIR MANAGEMENT TABLE (STORAGE APPARATUS 1, 2) 1126

| SERIAL NUMBER 64036 | | | SERIAL NUMBER 64016 | | | |
|---|---|---|---|---|---|---|
| P/S TYPE | VDEV# | PAIR STATUS | P/S TYPE | VDEV# | PAIR STATUS | LOCK DISK ID |
| P | 00:00:00 | PAIR STATE | S | 00:07:50 | PAIR STATE | 0x00 |
| P | 00:00:01 | SUSPEND STATE | S | 00:07:51 | SUSPEND STATE | 0x00 |
| P | 00:00:02 | SUSPEND STATE | S | 00:07:52 | SSWS STATE | 0x00 |
| S | 00:07:53 | PAIR STATE | P | 00:00:01 | PAIR STATE | 0x00 |

[Fig. 19]
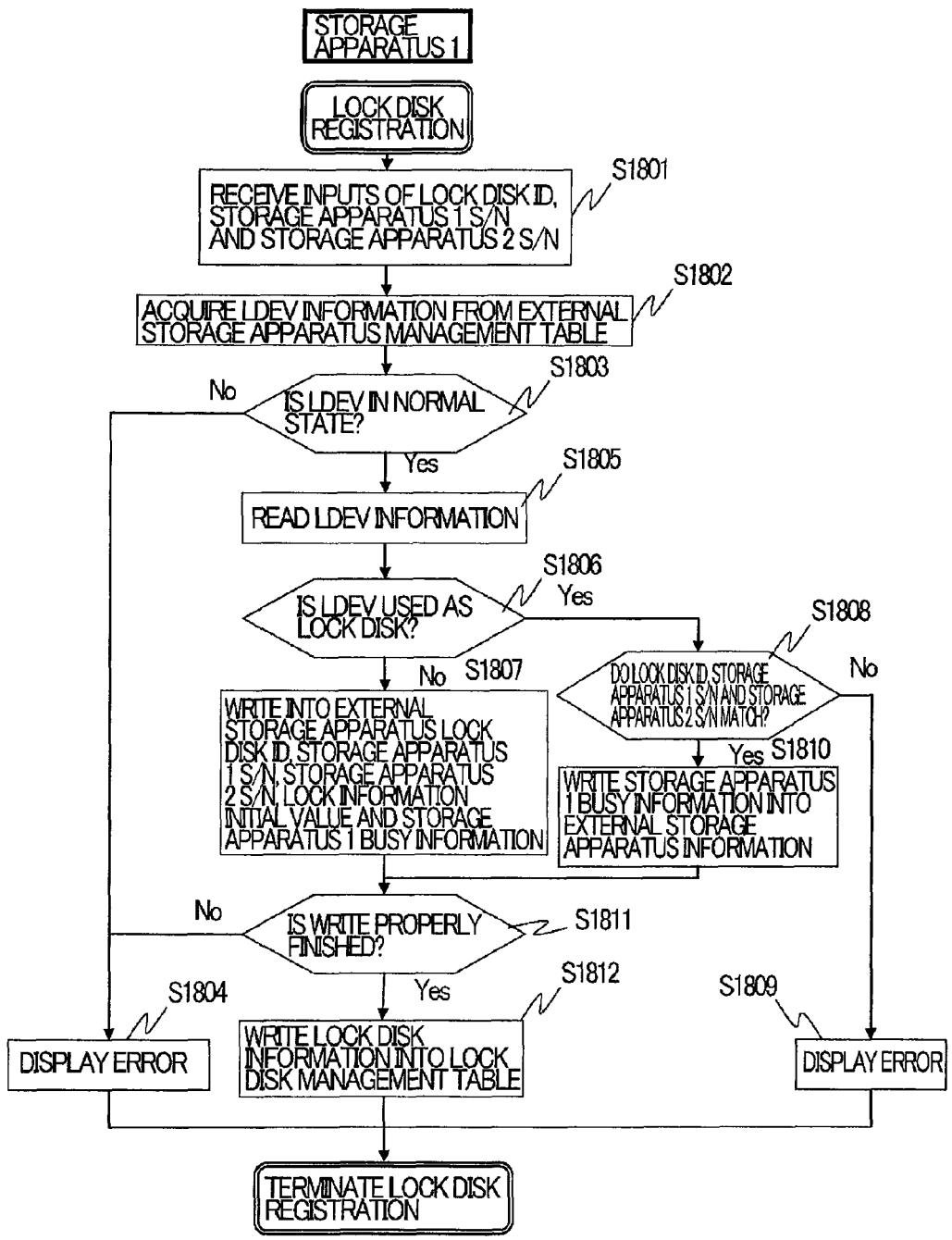

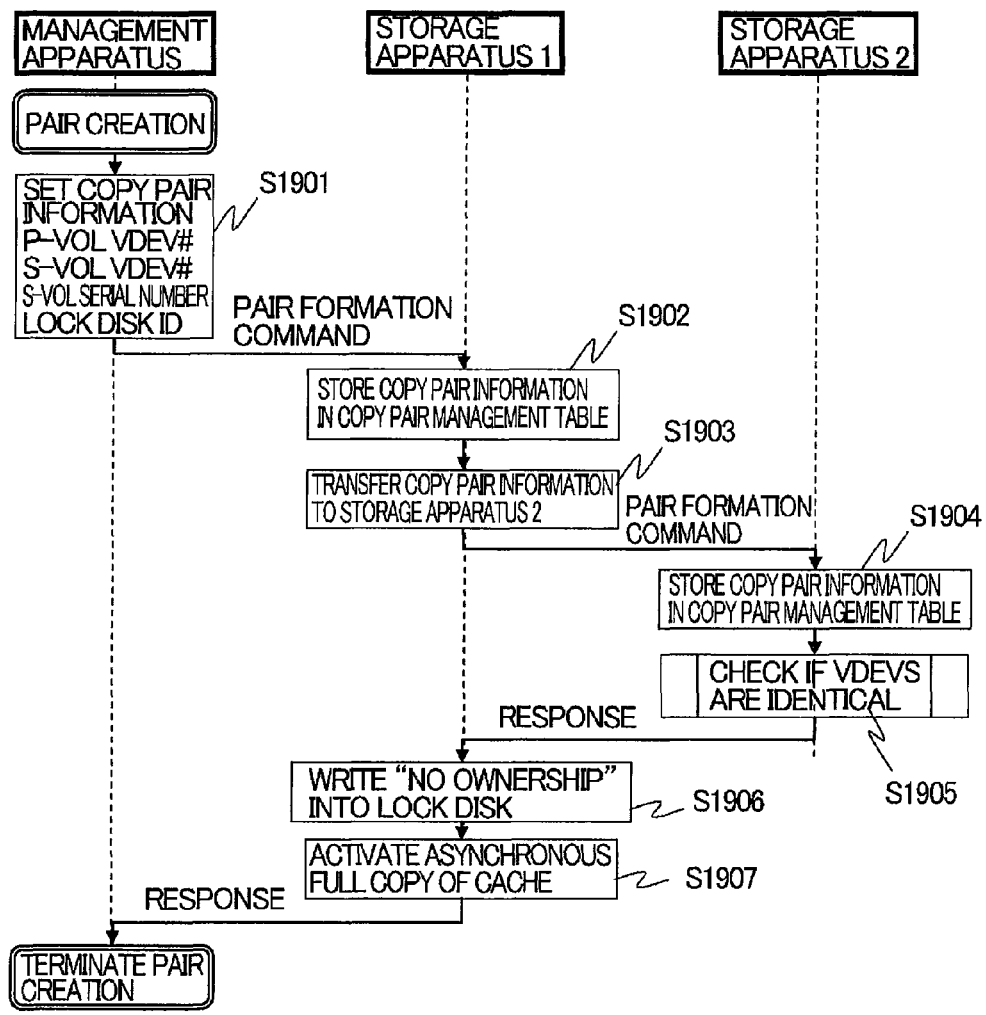
[Fig. 20]

[Fig. 21]
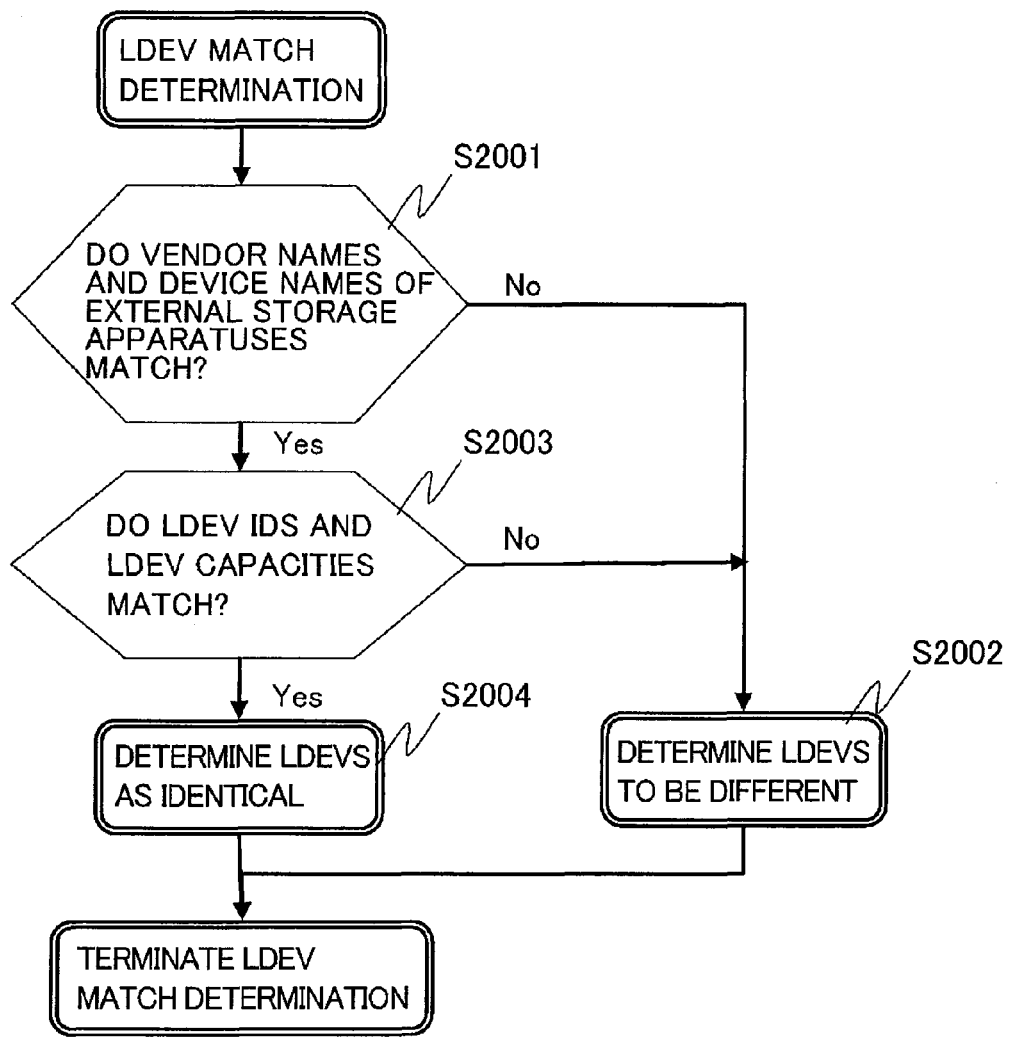

[Fig. 22]
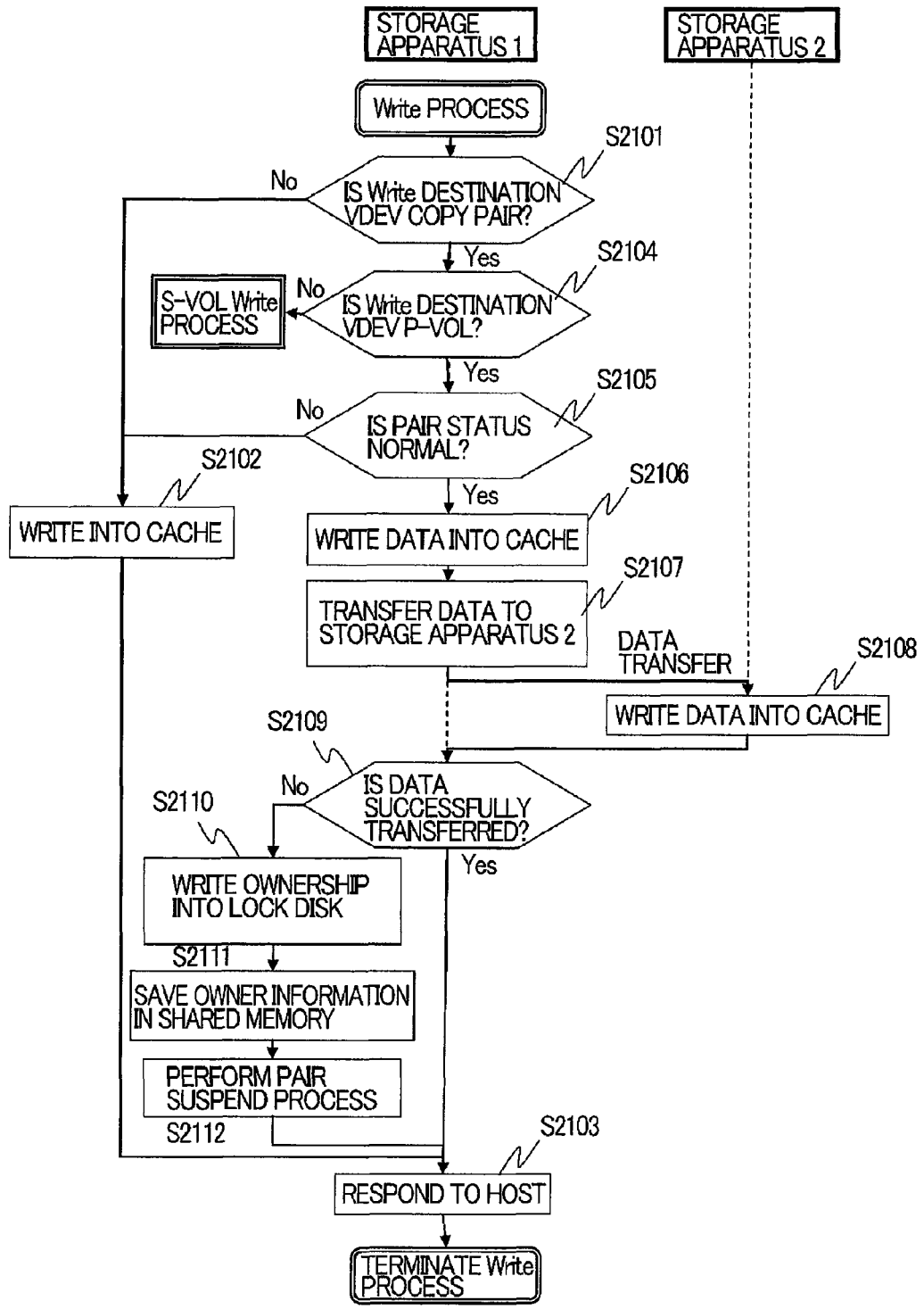

[Fig. 23]
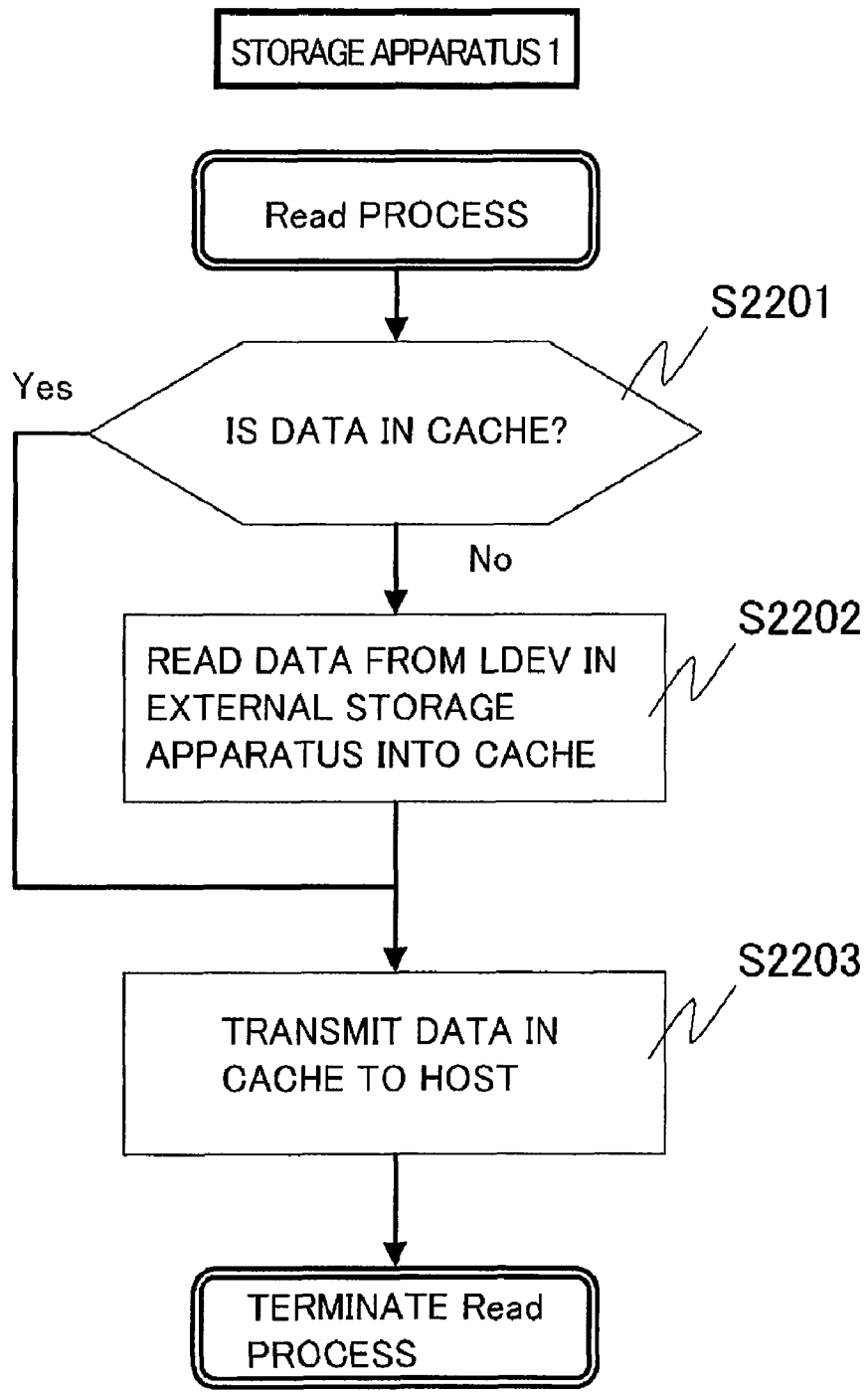

[Fig. 24]
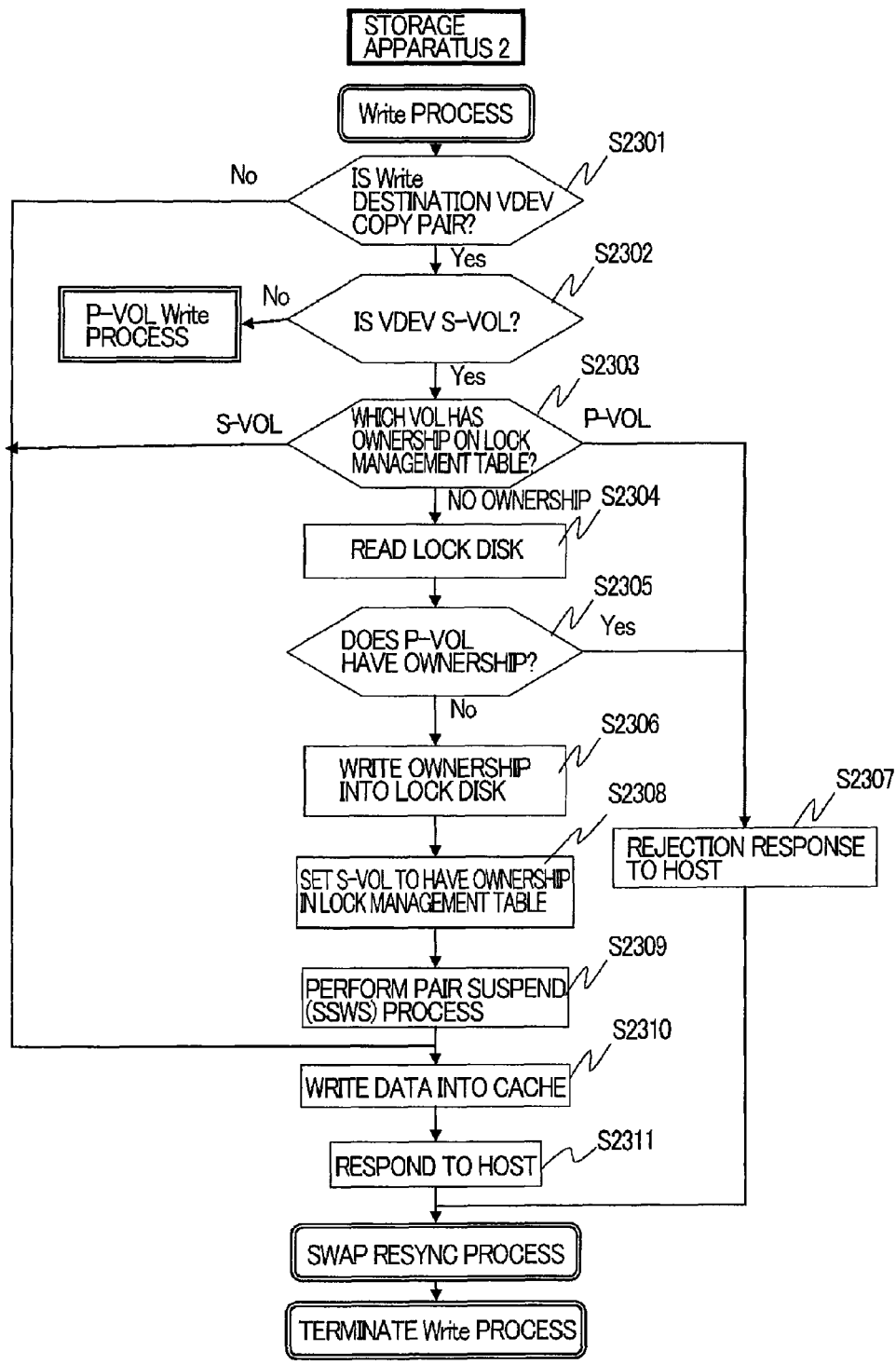

[Fig. 25]
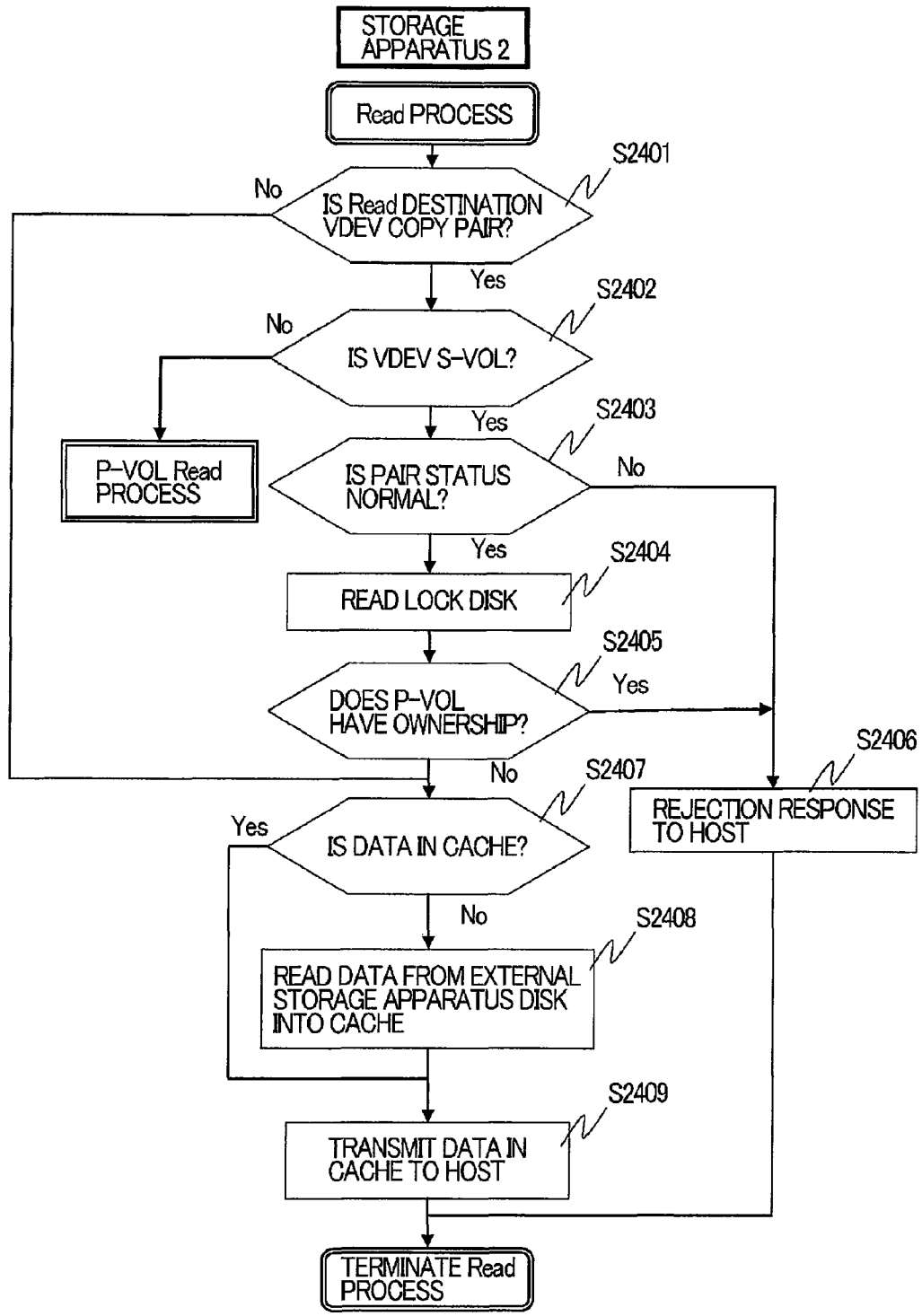

[Fig. 26]
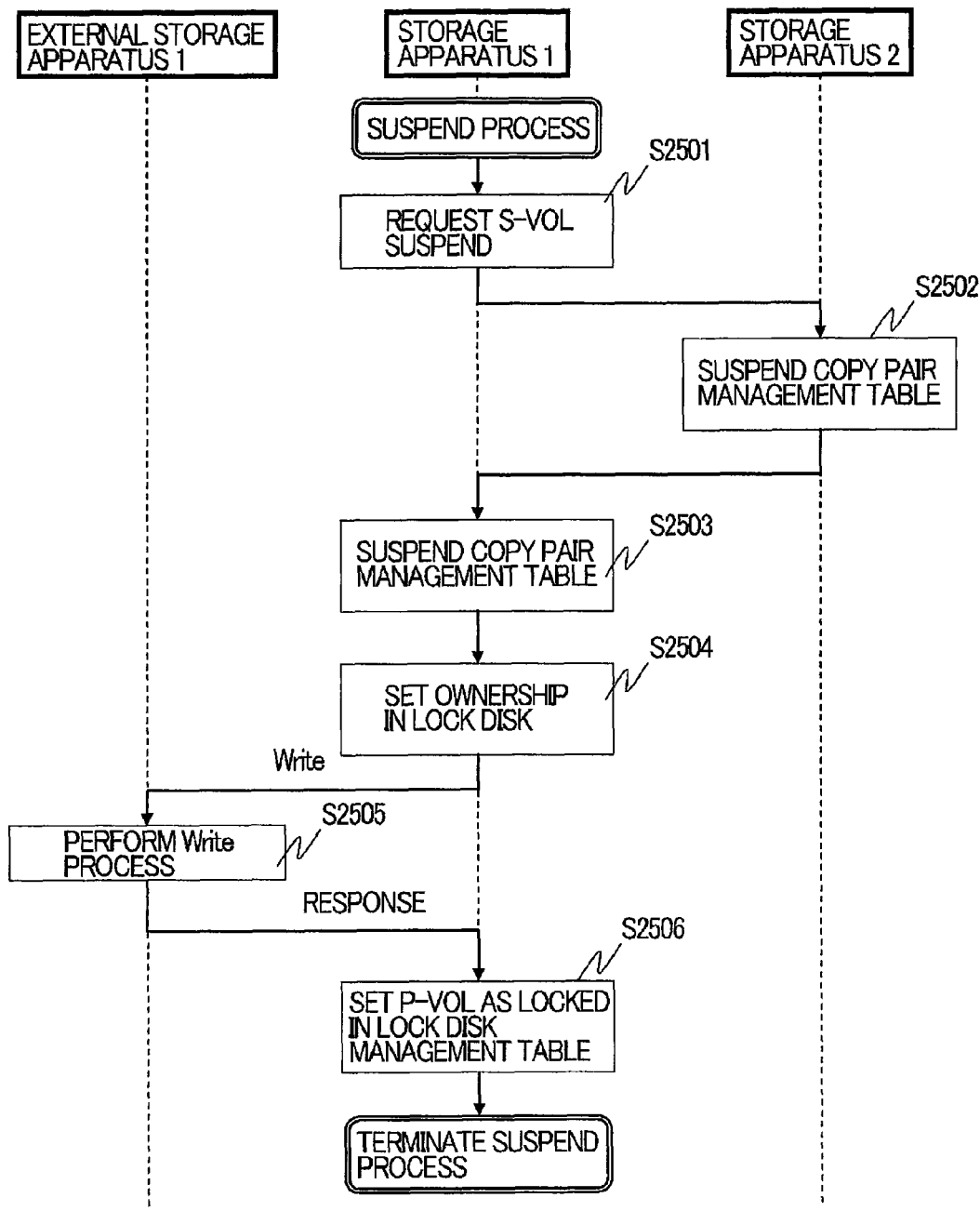

[Fig. 27]
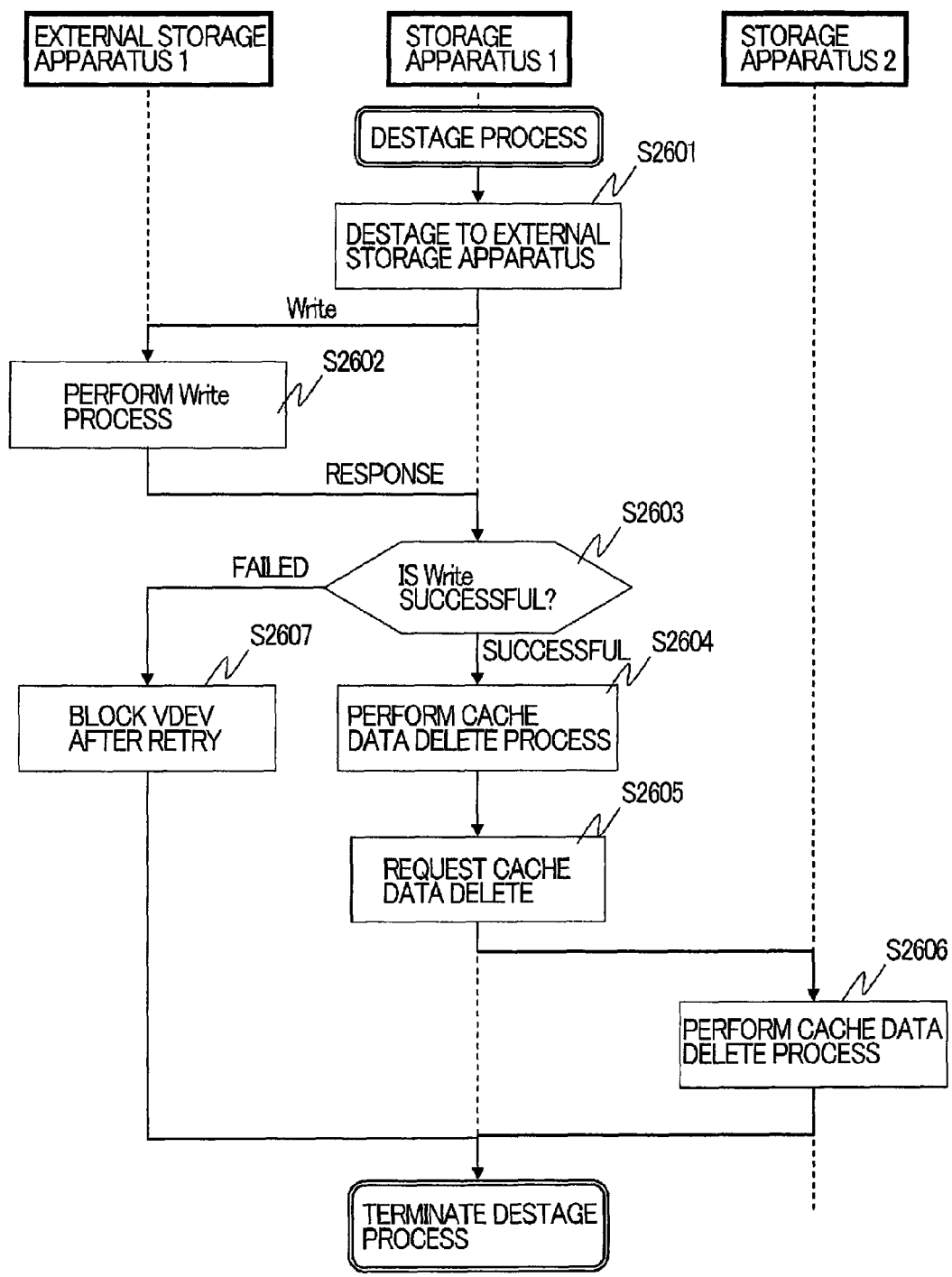

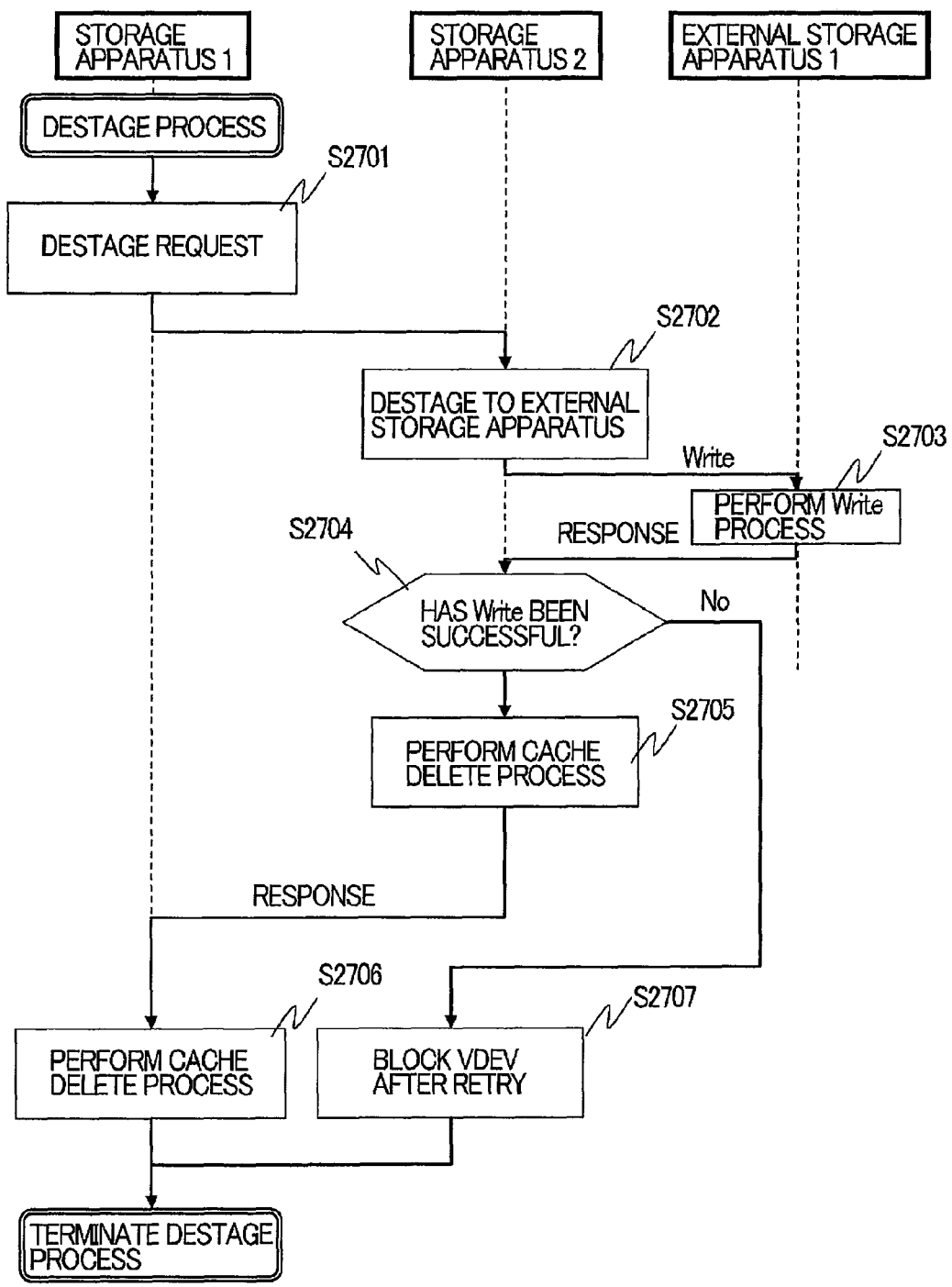

[Fig. 29]
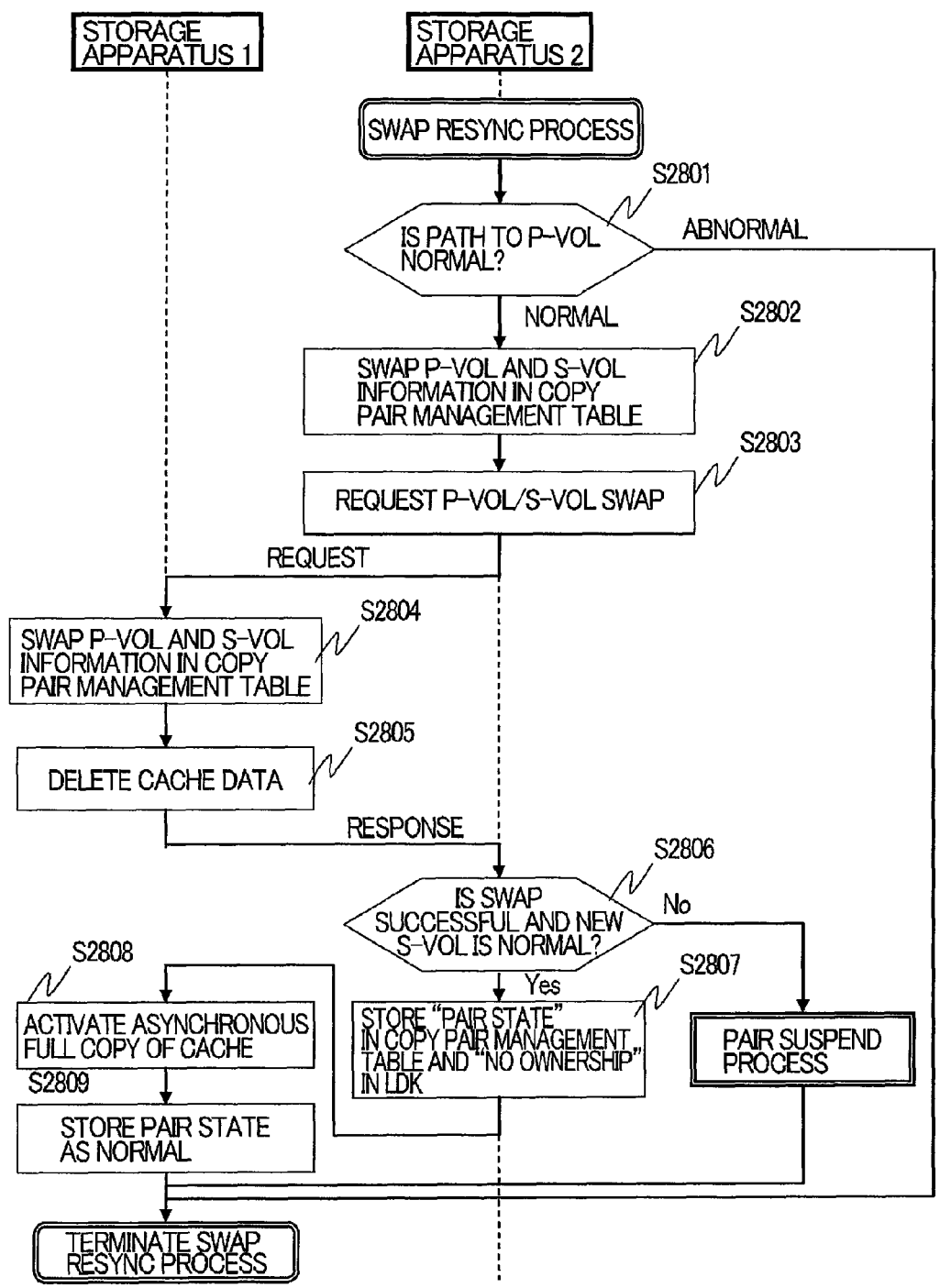

[Fig. 30]
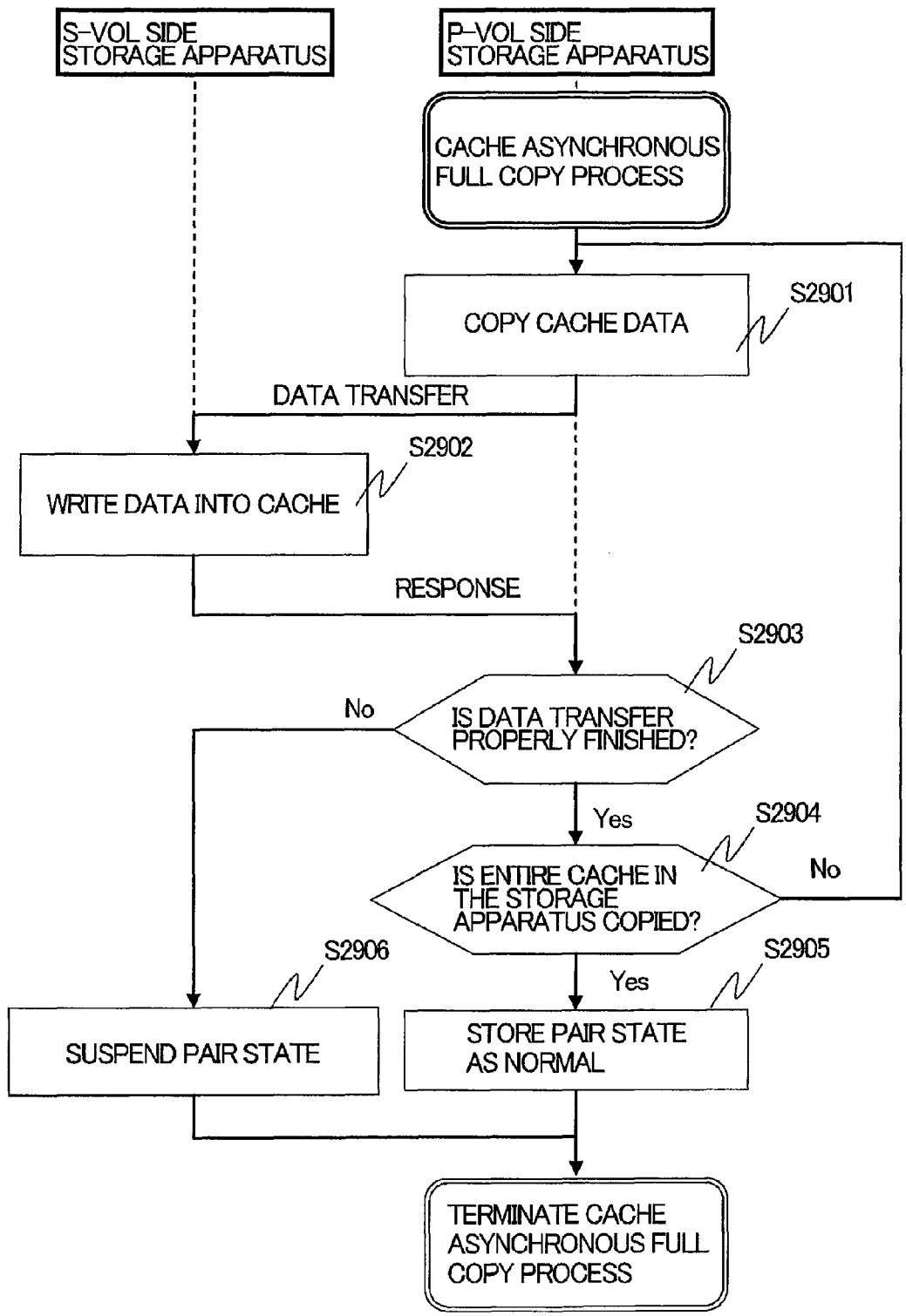

STORAGE SYSTEM WITH REMOTE COPY CONTROLLERS

TECHNICAL FIELD

The present invention relates to a storage system and a method for controlling a storage system including a plurality of storage apparatuses, and more specifically relates to a storage system and a method for controlling a storage system including a plurality of storage apparatuses, which enable more efficient and effective utilization of storage areas provided by the storage apparatuses.

BACKGROUND ART

For a storage apparatus providing a data storage area to an external apparatus such as a host apparatus, a storage virtualization mechanism has been increasingly utilized. With use of the storage virtualization mechanism, the storage apparatus provides the external apparatus with not only a hard disk drive (hereinafter "HDD") included in the apparatus itself, but also a virtual logical device (Virtual logical DEVice, hereinafter "VDEV"). The VDEV is a virtual unit storage area and is provided based on a physical storage area provided by an HDD included in another external storage apparatus externally coupled to a disk controller (hereinafter "DKC") in the storage apparatus itself.

Such a virtualization mechanism enables dynamic allocation of storage areas according to a storage capacity required by the external apparatus, rather than previously allocating storage areas to the external apparatus in a fixed manner. Thus, hardware resources of the storage apparatus can be effectively utilized. Examples of such a storage virtualization mechanism are disclosed in Patent Citations 1 to 3, for example.

However, the virtualization mechanism has a problem that all of the VDEVs provided by the external storage apparatus cannot be utilized when failure occurs in the DKC of the storage apparatus, for example. In order to solve this problem, for example, Patent Citation 4 proposes a configuration using a dual-DKC system for an external apparatus, the system including two DKCs coupled to the external apparatus through alternate path connection.

Patent Citation 1: Japanese Patent Application Laid-open Publication No. 2006-285876
Patent Citation 2: Japanese Patent Application Laid-open Publication No. 2007-72538
Patent Citation 3: Japanese Patent Application Laid-open Publication No. 2005-107645
Patent Citation 4: Japanese Patent Application Laid-open Publication No. 2008-225753

DISCLOSURE OF INVENTION

Technical Problem

However, the configuration using the merely dual DKCs still has the following problem. Specifically, in the case where there is no consistency between data stored in respective cache memories (hereinafter "CMs") in the DKCs, the data in the HDD may be overwritten with unauthorized old data when each of the DKCs performs destage process of writing the data in the CM into the HDD in the external storage apparatus.

The present invention was made to solve the foregoing problems, and an object of the present invention is to provide a storage system and a method for controlling a storage system, which enable more efficient and effective utilization of storage areas provided to an external apparatus by a storage apparatus.

Technical Solution

In order to solve the foregoing and other problems, one aspect of the prevent invention is a storage system including a first storage apparatus and a second storage apparatus, which are communicatively coupled to an external apparatus, the first and second storage apparatuses respectively having: first and second storage areas VDEVs selectively accessible from the external apparatus to store data of the external apparatus; first and second temporary storage areas temporarily storing input/output data of the first and second storage areas; and remote copy controllers configured to control data copy process between the first and second storage areas and between the first and second temporary storage areas, and the first and second storage areas being formed by having a logical device allocated thereto in a virtual manner, the logical device generated from at least one physical storage medium provided in a third storage apparatus communicatively coupled to the first and second storage apparatuses. The storage system comprises a data I/O process authority information storage unit storing data I/O process authority information indicating which one of the first and second storage areas has the authority to process data I/O of the external apparatus. In the storage system, the remote copy controller in any one of the first and second storage apparatuses reads the data I/O process authority information stored in the data I/O process authority information storage unit and copies, to the other storage apparatus, data stored either in the first storage area and the first temporary storage area or in the second storage area and the second temporary storage area, which are included in the one of the first and second storage apparatuses to which the remote copy controller belongs, when it is determined that the data I/O process authority information is not recorded and that the own storage apparatus is a primary logical device in remote copy control.

Advantageous Effects

The present invention can provide a storage system and a method for controlling a storage system, which enable more efficient and effective utilization of storage areas provided by a storage apparatus.

BRIEF DESCRIPTION OF THE DRAWINGS

FIG. 1 is a diagram showing a schematic configuration of a storage system according to an embodiment of the present invention.
FIG. 2 is a diagram showing a general configuration of a computer used as a host apparatus or a management apparatus.
FIG. 3 is a diagram showing an example of a software configuration of the host apparatus.
FIG. 4 is a diagram showing an example of a software configuration of the management apparatus.
FIG. 5 is a diagram showing an example of configurations of a storage apparatus and an external storage apparatus.
FIG. 6 is a schematic diagram showing an example of a configuration of a shared memory included in the storage apparatus.
FIG. 7 is a view showing an example of an external appearance of a housing of the storage apparatus.

FIG. 8 is a diagram showing an example of a configuration of a storage system including a plurality of external storage apparatuses.

FIG. 9 is a schematic diagram showing an example of communication paths between the host apparatus, the storage apparatuses and the external storage apparatus.

FIG. 10 is a schematic diagram showing an outline of control in the storage system according to this embodiment.

FIG. 11 is a table showing a relationship between a copy pair status between VDEVs and an ownership in the storage system according to this embodiment.

FIG. 12 is a schematic diagram showing an outline of control in the case of destage from the storage apparatus on P-VOL side.

FIG. 13 is a schematic diagram showing an outline of control in the case of destage from the storage apparatus on S-VOL side.

FIG. 14 is a table showing an example of an external storage apparatus management table (storage apparatus 1 side).

FIG. 15 is a table showing an example of an external storage apparatus management table (storage apparatus 2 side).

FIG. 16 is a table showing an example of a lock disk management table (storage apparatus 1 side).

FIG. 17 is a table showing an example of a lock disk management table (storage apparatus 2 side).

FIG. 18 is a table showing an example of a copy pair management table.

FIG. 19 is a diagram showing an example of a lock disk registration process flow according to the embodiment of the present invention.

FIG. 20 is a diagram showing an example of a copy pair creation process flow according to the embodiment of the present invention.

FIG. 21 is a diagram showing an example of a VDEV identification matching process flow according to the embodiment of the present invention.

FIG. 22 is a diagram showing an example of a flow of a write process on the storage apparatus 1 side according to the embodiment of the present invention.

FIG. 23 is a diagram showing an example of a flow of a read process on the storage apparatus 1 side according to the embodiment of the present invention.

FIG. 24 is a diagram showing an example of a flow of the write process on the storage apparatus 2 side according to the embodiment of the present invention.

FIG. 25 is a diagram showing an example of a flow of the read process on the storage apparatus 2 side according to the embodiment of the present invention.

FIG. 26 is a diagram showing an example of a copy pair suspend process flow according to the embodiment of the present invention.

FIG. 27 is a diagram showing an example of a flow of a destage process on the storage apparatus 1 side according to the embodiment of the present invention.

FIG. 28 is a diagram showing an example of a flow of the destage process on the storage apparatus 2 side according to the embodiment of the present invention.

FIG. 29 is a diagram showing an example of a swap resync process flow according to the embodiment of the present invention.

FIG. 30 is a diagram showing an example of an asynchronous full copy process flow for a cache memory according to the embodiment of the present invention.

EMBODIMENTS OF INVENTION

With reference to the accompanying drawings, an embodiment of the present invention will be described below.

Configuration of Storage System According to Embodiment

First, with reference to FIG. 1, a configuration of a storage system according to this embodiment will be described. FIG. 1 is a diagram showing an example of a configuration of a storage system 1 according to this embodiment. As shown in FIG. 1, the storage system 1 according to this embodiment includes two storage apparatuses 100, a management apparatus 200 for this system 1, a host apparatus 300 as an external apparatus and two external storage apparatuses 400.

Note that, in the following description, the multiple storage apparatuses 100 and external storage apparatuses 400 will be called the storage apparatuses 1 and 2 and the external storage apparatuses 1 and 2, respectively, when those apparatuses are distinguished from each other.

Between the host apparatus 300 and the storage apparatuses 100 and between the storage apparatuses 100 and the external storage apparatuses 400, communication networks N1 are provided, respectively, to couple the respective apparatuses so as to allow communication between the apparatuses. In this embodiment, each of the communication networks N1 is a SAN (Storage Area Network) which enables communication according to a fiber channel (hereinafter "FC") protocol, for example. Each communication network N1 is generally formed to have a redundant configuration including multiple FC switches (not shown).

Between the management apparatus 200 and the storage apparatuses 100, the external storage apparatuses 400 and the host apparatus 300, a communication network N2 is provided to couple the respective apparatuses so as to allow communication between the apparatuses. In this embodiment, the communication network N2 is a LAN (Local Area Network) which enables IP (Internet Protocol) connection, for example.

As schematically shown in FIG. 1, a logical device (Logical DEVice, hereinafter the "LDEV") that is a logical unit storage area is created from a physical storage area provided by a HDD in each of the external storage apparatuses 400. Moreover, as described later, the LDEV in the external storage apparatus 400 is provided to the host apparatus 300 as a VDEV in the storage apparatus 100. In the example of FIG. 1, the LDEV in the external storage apparatus 1 of the two external storage apparatuses 400 (external storage apparatuses 1 and 2) is mapped onto VDEVs in the two storage apparatuses 100 (storage apparatuses 1 and 2), respectively. Accordingly, an application to be run in the host apparatus 300 recognizes as if data is written into and read from one VDEV.

A data I/O path between the host apparatus 300 and each of the storage apparatuses 100 is formed as an alternate path between the storage apparatuses 1 and 2. The data I/O path is switched so as to allow the host apparatus 300 to perform data I/O process with the storage apparatus 1 under normal conditions and with the storage apparatus 2 under predetermined conditions.

Configurations of Management Apparatus 200 and Host Apparatus 300

Next, configurations of the management apparatus 200 and the host apparatus 300 will be described. FIG. 2 shows an example of a hardware configuration of a computer 10 that can be used as the management apparatus 200 or the host apparatus 300. The computer 10 includes a central processing unit 11 (for example, a CPU (Central Processing Unit) or a MPU (Micro Processing Unit), hereinafter simply referred to as "CPU"), a main storage unit 12 (for example, a RAM (Random Access Memory) or a ROM (Read Only Memory)), an auxiliary storage unit 13 (for example, a hard disk), an input unit 14 (for example, a keyboard and a mouse) for receiving an operation input by a user, an output unit 15 (for example, a liquid crystal monitor) and a communication interface 16 (for example, an NIC (Network Interface Card) and a HBA (Host Bus Adapter)) for achieving communication with other apparatuses.

Next, the management apparatus 200 will be described. As shown in FIG. 2, the management apparatus 200 includes the CPU 11, the main storage unit 12 and the communication interface 16. The CPU 11, the main storage unit 12 and the communication interface 16 are coupled to each other through a bus. The CPU 11 is an arithmetic processing unit for executing various programs stored in the main storage unit 12. The main storage unit 12 is a so-called internal storage unit and includes a nonvolatile memory for storing various programs and the like and a volatile memory for temporarily storing an arithmetic processing result. The communication interface 16 is coupled to the storage apparatuses 100, the external storage apparatuses 400 and the host apparatus 300 via the communication network N2 that is the LAN in this embodiment.

FIG. 3 shows an example of a software configuration of the management apparatus 200. The management apparatus 200 has a function of managing the configuration of each storage apparatus 100 and giving an instruction to the host apparatus 300 via the communication network N2. The management apparatus 200 includes a lock disk setting part 211 and a remote copy setting part 212 in addition to basic functions required to manage the storage system 1. The main storage unit 12 in the management apparatus 200 stores programs for implementing functions of the lock disk setting part 211 and the remote copy setting part 212. A data I/O part 213 controls data input and output to and from the storage apparatuses 100, the external storage apparatuses 400 and the host apparatus 300.

The lock disk setting part 211 has a function of setting a lock disk (Lock DisK, hereinafter "LDK") that is a HDD for storing "ownership" (data I/O process authority information) used to manage which one of the storage apparatuses 1 and 2 in the storage system 1 of this embodiment has the authority to receive data I/O of the host apparatus 300. Note that the ownership and the LDK will be described in detail later.

Assuming that one of the VDEVs in the storage apparatuses 1 and 2 is a primary logical device (hereinafter referred to as a "P-VOL" (Primary Volume) as a general term) to be a copy source and the other is a secondary logical device (similarly, hereinafter referred to as a "S-VOL" (Secondary Volume)) to be a copy destination, the remote copy setting part 212 has a function of setting the P-VOL and the S-VOL as a copy pair and a function of associating the copy pair with the LDK.

Next, the host apparatus 300 will be described. A hardware configuration of the host apparatus 300 is the same as that described with reference to FIG. 2, and thus description thereof will be omitted. FIG. 4 shows an example of a software configuration of the host apparatus 300. The host apparatus 300 includes an OS (Operation System) for providing basic functions of the host apparatus 300, an application program 311 run on the OS, a path management controller 312 and a data I/O part 313.

The application program 311 includes various business programs and one or more application programs can be implemented. The path management controller 312 manages setting of data I/O paths between the host apparatus 300 and the storage apparatuses 1 and 2. Specifically, for example, the path management controller 312 normally sets a data I/O path between the host apparatus 300 and the storage apparatus 1, monitors a state of the data I/O path and switches the data I/O path to the storage apparatus 2 when an error is returned from the storage apparatus 1 in response to a write request or when it is determined that no response is returned even after a write request is retried.

The data I/O part 313 controls data input and output to and from the storage apparatuses 100, the external storage apparatuses 400 and the management apparatus 200. Note that, as the OS of the host apparatus 300, virtualization software, for example, Xen (registered trademark) or VMWare (registered trademark) for providing a virtual server function may be implemented and the host apparatus 300 may be operated as a virtual server.

Configurations of Storage Apparatus 100 and External Storage Apparatus 400

Next, the storage apparatus 100 and the external storage apparatus 400 will be described. FIG. 5 shows an example of configurations of the storage apparatus 100 and the external storage apparatus 400. The storage apparatus 100 includes a disk controller (DKC) 110 and a disk unit 120 including multiple hard disk drives (HDDs) 121. The storage apparatus 100 in this embodiment is a disk array apparatus including the multiple HDDs 121 arranged in an appropriate RAID configuration, and provides one or more RAID groups 122 having the RAID configuration. The RAID group 122 provides one or more logical devices (LDEVs). Note that another storage medium such as a semiconductor storage device (Solid State Drive, "SSD") can be adopted instead of the HDD 500.

The storage apparatus 100 in this embodiment can provide, as data storage areas in the host apparatus 300, a LDEV created from the HDDs 121 provided in the apparatus itself, and a virtual logical device (VDEV) obtained by virtualizing a LDEV created from HDDs 421 in the external storage apparatus 400 to be described later. Note that the storage apparatus 100 can be configured to provide the host apparatus 300 with only a VDEV created from the LDEV of the external storage apparatus 400 without providing the LDEV of its own. In this embodiment, each of the storage apparatuses 100 includes one VDEV created from the LDEV of the external storage apparatus 400.

As shown in FIG. 5, the disk controller 110 in the storage apparatus 100 includes a CPU 111, a shared memory (hereinafter "SM") 112, a cache memory (CM) 113, a channel adapter (CHannel Adapter, hereinafter "CHA") 114, a disk adapter (DisK Adapter, hereinafter "DKA") 115, a service processor (SerVice Processor, hereinafter "SVP") 116 and an internal network 117 coupling those described above.

The CPU 111 is an arithmetic processing unit for executing various programs stored in the shared memory 112 to be described later.

The shared memory 112 is a so-called internal storage unit and includes a nonvolatile memory for storing various programs, tables to be used by the programs and the like and a volatile memory for temporarily storing an arithmetic processing result. The cache memory (temporary storage area) 113 is a data buffer memory for shortening a data read time by temporarily storing data read from the DKA 115 and the CHA 114 to be described later. The DKA 115 is coupled to the HDDs 121 and controls data input and output between the disk controller 110 and the HDDs 121. Note that, when no HDDs 121 are provided in the storage apparatus 100, there is a case where the DKA 115 is not provided.

The CHA 114 is a communication interface for controlling data input and output to and from the communication network N1 that is the SAN using the FC protocol in this embodiment. Moreover, the CHA 114 includes multiple communication ports and is coupled to the host apparatus 300 and the external storage apparatus 400 via the communication network N1. Through the CHA 114, data is written into and read from the HDDs 421 in the external storage apparatus 400.

The SVP 116 is a computer including: a memory storing a program having a function for collecting configuration information, operation state information and the like on the storage apparatus 100 or for giving an instruction to the disk controller 110; and a processor for executing the program. The SVP 116 also has a function of a communication interface for controlling data input and output to and from the communication network N2 that is the IP-coupled LAN in this embodiment. The SVP 116 is coupled to the management apparatus 200 via the communication network N2. Note that a network interface card merely as a communication interface having no function of the SVP 116 may be provided.

Next, the shared memory 112 will be described. FIG. 6 shows an example of a configuration of the shared memory 112. In the shared memory 112, stored are: a virtualization management part 1121, a remote copy controller 1122, a data I/O part 1123, an external storage apparatus management table 1124, a lock disk management table 1125 and a copy pair management table 1126.

The virtualization management part 1121 has a function of mapping a correspondence relationship between the LDEV provided by the external storage apparatus 400 and the VDEV that is the virtual logical device provided to the host apparatus 300, thereby allowing the host apparatus 300 to transparently recognize the storage area in the external storage apparatus 400 as the storage area in the storage apparatus 100 and to execute data input and output.

The remote copy controller 1122 has a function of achieving main process in the storage system 1 according to this embodiment, and performs process such as control of ownership regarding data input and output to and from the host apparatus 300, control of data copy of the CM 113 between the storage apparatuses 100 and control of destage process of writing data stored in the CM 113 in the storage apparatus 100 into the HDDs 421 in the external storage apparatus 400. The above process will be described later with reference to flowcharts and the like. The data I/O part 1123 performs data I/O control for the DKC 110. Configurations and roles of the external storage apparatus management table 1124, the lock disk management table 1125 and the copy pair management table 1126 will be described later.

Next, with reference to FIG. 5, the external storage apparatus 400 will be described. As shown in FIG. 5, the configuration of the external storage apparatus 400 is basically the same as that of the storage apparatus 100. However, in the configuration of the shared memory 112, for example, the virtualization management part 1121, the remote copy controller 1122 and the tables used thereby are omitted.

FIG. 7 shows an external perspective view (an example) of the storage apparatus 100. The storage apparatus 100 includes a base housing 101 in which the DKC 110 is mounted and an extension housing 102 in which an extension hard disk drive 171 is mounted.

Configuration Example having Multiple VDEVs and LDEVs

FIG. 8 shows a general configuration example of the storage system 1 according to this embodiment. In the example of FIG. 8, LDEV1 to LDEV4 are provided in the four external storage apparatuses 400, respectively. For these LDEVs, VDEV1 to VDEV4 are created in each of the storage apparatuses 100. The host apparatus 300 can use storage areas provided by the LDEVs in the external storage apparatuses 400 through the VDEVs in the storage apparatus 1 or the storage apparatus 2. Note that the VDEVs in the storage apparatus 100 may also be provided to the host apparatus 300 as multiple logical units ("LUs").

Functions of Storage System 1 According to This Embodiment

Next, description will be given of an outline of main functions to be achieved by the storage system 1 according to this embodiment. FIG. 9 schematically shows communication paths provided between the host apparatus 300, the storage apparatuses 1 and 2 (100), the external storage apparatus 400 and the lock disk (LDK) in the storage system 1. The host apparatus 300 has the configuration described with reference to FIGS. 2 and 3 and is coupled to a CHA1 (114) in each storage apparatus 100 by a host bus adapter (HBA) 320. Thus, a data write/read request is transmitted to the storage apparatus 100 from the host apparatus 300, and the host apparatus 300 receives data read from the storage apparatus 100.

The DKCs 110 in the storage apparatuses 100 are coupled so as to be able to communicate with each other through CHA2 (114) and, as described later, data stored in the CMs 113 are copied or various control signals are transmitted and received between the storage apparatuses 100.

Between a CHA3 (114) in each storage apparatus 100 and the external storage apparatus 400, data I/O of the host apparatus 300 to the VDEVs in the storage apparatus 100 is executed as transmission and reception to and from a predetermined LDEV in the external storage apparatus 400 by the function of the virtualization management part 1121 in the DKC 110 of the storage apparatus 100.

A CHA4 (114) in each storage apparatus 100 is coupled to the HDD 421 in the external storage apparatus 400 so as to be able to communicate therewith. Thus, the lock disk (LDK) is registered in the external storage apparatus management table 1124 to be described later by the lock disk setting part 211 in the management apparatus 200.

FIG. 10 schematically shows an outline of the functions of the storage system 1. Through the communication path shown in FIG. 9, the VDEV in the storage apparatus 1 and the VDEV in the storage apparatus 2 are set as a remote copy pair of a primary logical volume (P-VOL) and a secondary logical volume (S-VOL). In a normal state, data I/O is performed between the host apparatus 300 and the VDEV in the storage apparatus 1 as the P-VOL. When data is written into the VDEV in the storage apparatus 1 as the P-VOL, the written data is reflected in a difference copy or the like in the VDEV in the storage apparatus 2 as the S-VOL on a timely basis. Therefore, even when failures occur in the storage apparatus 1 having the P-VOL, the host apparatus 300 can be operated by use of the storage apparatus 2 having the S-VOL.

Moreover, stored data is copied between the CM 113 in the storage apparatus 1 and the CM 113 in the storage apparatus 2. Even when a data I/O target of the host apparatus 300 is changed, efficient data I/O can be immediately executed by utilizing the data stored in one of the CMs 113.

Relationship between Remote Copy Pair Status and Ownership

Here, description will be given of a relationship between an ownership for determining a data I/O target from the host apparatus 300 and states of the P-VOL (the VDEV in the storage apparatus 1) and the S-VOL (the VDEV in the storage apparatus 2) that form a remote copy pair. FIG. 11 shows a relationship between a remote copy pair status and the ownership in the form of a table.

In a "PAIR" state where the pair of the P-VOL and the S-VOL normally functions, the P-VOL has the ownership which is the authority to receive data I/O of the host apparatus 300. Thus, the P-VOL can perform data I/O to and from the host apparatus 300. In this event, no data I/O is performed between the S-VOL and the host apparatus 300. The data I/O between the S-VOL and the host apparatus 300 is permitted when the pair status becomes a SSWS (S-VOL SWap Suspend) state to be described later.

When a data copy from the P-VOL to the S-VOL can no longer be executed for any reason such as failures in the storage apparatus 2 on the S-VOL side or in the data communication path between the DKCs 110, the pair status is shifted to a "FAILURE SUSPEND" state. In this state, the storage apparatus 1 on the P-VOL side still has the ownership, and thus no data I/O is performed between the S-VOL and the host apparatus 300.

In the "PAIR" state that is the normal state, when the path management controller 312 in the host apparatus 300 determines that there is some trouble or the like in the storage apparatus 1 or in the communication path between the host apparatus 300 and the storage apparatus 1, such as when there is no response from the storage apparatus 1 with respect to the data I/O of the host apparatus 300 to the P-VOL even after a predetermined number of retries are made, the path management controller 312 in the host apparatus 300 changes the data I/O path to the storage apparatus 2 on the S-VOL side. In this event, the ownership is changed to the S-VOL and then the host apparatus 300 performs data I/O to and from the S-VOL.

Destage Mode for Cache Memory Data According to This Embodiment

Next, with reference to FIGS. 12 and 13, destage of the data stored in the cache memory (CM) to the HDD 421 in the external storage apparatus 400 will be described according to this embodiment. FIG. 12 is a schematic diagram showing destage procedures from the CM 113 in the storage apparatus 1 on the P-VOL side to the HDDs 421 that form the LDEV in the external storage apparatus 400. FIG. 13 is a schematic diagram showing the same destage procedures from the storage apparatus 2 on the S-VOL side.

Destage Procedures from CM 113 on P-VOL Side

With reference to FIG. 12, the host apparatus 300 performs data I/O to and from the P-VOL, and a data write request from the host apparatus 300 is stored in the CM 113 on the P-VOL side ((a) Write DATA). Next, the remote copy controller 1122 in the storage apparatus 1 copies the Write DATA stored in the CM 113 of the storage apparatus 1 to the CM 113 of the storage apparatus 2 through a path (inter-DKC path) between the CHA2 (114) in the storage apparatus 1 and the CHA2 (114) in the storage apparatus 2 ((b) CACHE DATA COPY).

In this event, since the data stored in the CM 113 of the storage apparatus 1 and the data stored in the CM 113 of the storage apparatus 2 match, the remote copy controller 1122 in the storage apparatus 1 destages the data stored in the CM 113 of its own to the external storage apparatus 400 ((c) DESTAGE). When it is determined that the destage has been successful, the remote copy controller 1122 in the storage apparatus 1 transmits a request to delete the data stored in the CM 113 of the storage apparatus 2 to the remote copy controller 1122 in the storage apparatus 2 through the inter-DKC path ((d) CACHE DATA DELETE REQUEST). The remote copy controller 1122 in the storage apparatus 2 receives the delete request and then deletes the data in the CM 113 of its own to release the storage area of the CM 113.

Furthermore, the remote copy controller 1122 in the storage apparatus 1 copies all the data stored in the CM 113 of its own to the CM 113 in the storage apparatus 2 in order to allow the data in the CM 113 of its own to match the data in the CM 113 of the storage apparatus 2 again. The above destage process from the P-VOL will be described in detail later with reference to a flowchart.

Destage Procedures from CM 113 on S-VOL Side

With reference to FIG. 13, as in the case of FIG. 12, the host apparatus 300 performs data I/O to and from the P-VOL, and a data write request from the host apparatus 300 is stored in the CM 113 on the P-VOL side ((a) Write DATA). Next, the remote copy controller 1122 in the storage apparatus 1 copies the Write DATA stored in the CM 113 of the storage apparatus 1 to the CM 113 of the storage apparatus 2 through the path (inter-DKC path) between the CHA2 (114) in the storage apparatus 1 and the CHA2 (114) in the storage apparatus 2 ((b) CACHE DATA COPY).

In this event, as in the case of FIG. 12, the data stored in the CM 113 of the storage apparatus 1 and the data stored in the CM 113 of the storage apparatus 2 match. Here, the remote copy controller 1122 in the storage apparatus 1 requests the remote copy controller 1122 in the storage apparatus 2 to destage the data stored in the CM 113 of the storage apparatus 2 to the external storage apparatus 400 ((c) DESTAGE REQUEST). Upon receipt of the request, the remote copy controller 1122 in the storage apparatus 2 destages the data stored in the CM 113 of its own to the external storage apparatus 400 ((d) DESTAGE).

When it is determined that the destage has been successful, the remote copy controller 1122 in the storage apparatus 2 transmits a notification indicating that the destage is completed to the remote copy controller 1222 in the storage apparatus 1 through the inter-DKC path ((e) DESTAGE COMPLETION NOTIFICATION). The above destage process from the S-VOL will be described in detail later with reference to a flowchart.

Explanation of Tables Used in This Embodiment

Next, with reference to FIGS. 14 to 18, description will be given of tables to be used in the process executed in the storage system 1 according to this embodiment.

External Storage Apparatus Management Table 1124

FIGS. 14 and 15 show examples of the external storage apparatus management table 1124. These external storage apparatus management tables 1124 are stored in the SMs 112 in the storage apparatuses 1 and 2, respectively, and set by a manager operating the management apparatus 200 before operation of the storage system 1 is started. The examples of FIGS. 14 and 15 show that four LDEVs are formed in one external storage apparatus 400 and another external storage apparatus 400 is registered as a lock disk (LDK) for managing the ownership. Note that information stored in the external storage apparatus management tables 1124 shown in FIGS. 14 and 15 are examples for explanation and do not show actual stored contents. Similarly, as for explanation of other tables below, information shown in the drawings are merely examples.

In the external storage apparatus management table 1124, the following items are stored: a serial number 11241, a vendor name 11242, an apparatus name 11243, LDEV identification information 11244, a LDEV capacity 11245, a VDEV number 11246, management information 11247 and path information 11248. Each stored in the external storage apparatus management table 1124 specifies a correspondence relationship between the LDEV formed in the external storage apparatus 400 and the VDEV in the storage apparatus 1 or 2.

In the column of the serial number 11241, a serial number of the external storage apparatus 400 which provides the LDEV or which is registered as the lock disk is stored. In the examples of FIGS. 14 and 15, the serial number of the external storage apparatus 400 providing the LDEV is "11234" and the serial number of the external storage apparatus 400 used as the LDK is "AB555".

In the column of the vendor name 11242, a name of a vendor who has supplied the external storage apparatuses 400 is stored. In the examples shown in FIGS. 14 and 15, a vendor name "HITACHI" is stored.

In the column of the apparatus name 11243, names of the external storage apparatuses 400 are stored. In the examples shown in FIGS. 14 and 15, "RAID" is stored for the external storage apparatus 400 providing the LDEV by using a RAID group formed of the HDDs 421, and "DF" is stored for the external storage apparatus 400 that is the LDK.

In the column of the LDEV identification information 11244, codes for distinguishing the LDEVs provided by the external storage apparatuses 400 from each other are stored. The codes can be stored as "0000" and "0010" as shown in FIG. 14 and may be appropriately set.

In the column of the LDEV capacity 11245, a capacity that can be provided by each LDEV is stored, for example, by the MByte.

In the column of the VDEV number 11246, codes for distinguishing the VDEVs in the storage apparatus 100 from each other are stored, each VDEV being associated with the LDEV provided by the external storage apparatuses 400. Although 4-digit numbers are used in the examples shown in FIGS. 14 and 15, arbitrarily set codes may be used.

In the column of the management information 11247, information indicating that the external storage apparatus 400 is registered as the LDK is stored. In the examples shown in FIGS. 14 and 15, "lock disk 0x00" is stored.

In the column of the path information 11248, identification information on a data I/O path set between each LDEV provided by the external storage apparatus 400 and each of the storage apparatuses 1 and 2 is stored.

Lock Disk Management Table 1125

FIGS. 16 and 17 show examples of the lock disk management table 1125. These lock disk management tables 1125 are stored in the SMs 112 in the storage apparatuses 1 and 2, respectively, and set by the manager operating the management apparatus 200 before operation of the storage system 1 is started. The lock disk management table 1125 is used by the remote copy controller 1122 in each of the storage apparatuses 1 and 2 to determine whether or not the apparatus has the ownership which is the authority to receive data I/O of the host apparatus 300.

In the lock disk management table 1125, the following items are stored: a lock disk ID 11251, table valid/invalid 11252, an own DKC serial number 11253, a paired DKC serial number 11254 and own DKC lock information 11255.

In the column of the lock disk ID 11251, lock disk IDs which are codes for distinguishing the LDKs from each other are stored. The lock disk ID 11251 corresponds to the information on the LDK stored in the column of the management information 11247 in the external storage apparatus management table 1124.

In the column of the table valid/invalid 11252, information indicating whether the lock disk management table 1125 is valid or invalid is stored. This information is used when only the setting is temporarily made invalid while leaving the registration as the LDK, for example.

In the column of the own DKC serial number 11253, a serial number of the DKC 110 having the SM 112 storing the lock disk management table 1125 is stored. Although a 5-digit number "64036" is stored in the example of FIG. 16, an appropriately set code may be used. In the column of the paired DKC serial number 11254, a serial number of the paired DKC 110 coupled, through the inter-DKC path, to the DKC 110 having the SM 112 storing the lock disk management table 1125 is stored. A pair of the own DKC serial number 11253 and the paired DKC serial number 11254 means a pair of the DKCs 110 in the storage apparatuses 1 and 2 having the VDEVs therein forming the remote copy pair.

In the column of the own DKC lock information 11255, information for determining whether or not the DKC 110 has the ownership of its own is stored. In the cases of FIGS. 16 and 17 in this embodiment, whether or not the DKC 110 has the ownership of its own is stored as bit map information. For example, in the case of "no ownership", 0 is stored in every bit. On the other hand, when any one of the DKCs 110 has the ownership, bit map information having a predetermined bit turned ON is stored. Information may be stored in any other format as the own DKC lock information 11255.

Copy Pair Management Table 1126

FIG. 18 shows an example of the copy pair management table 1126. The copy pair management table 1126 is stored in each of the SMs 112 in the storage apparatuses 1 and 2, and set by the manager operating the management apparatus 200 before operation of the storage system 1 is started. When the VDEV in the storage apparatus 1 and the VDEV in the storage apparatus 2 form a remote copy pair, the copy pair management table 1126 is used to manage a state of the copy pair.

In the copy pair management table 1126, items including a serial number 11261 and a lock disk ID 11265 are stored. Moreover, for each serial number 11261 in the copy pair management table 1126, items including a P/S type 11262, VDEV identification information 11263 and a pair status 11264 are also stored.

In the column of the serial number 11261, a serial number of the DKC 110 in the storage apparatus 100 having the VDEVs forming a copy pair is stored. The serial number 11261 corresponds to the own DKC serial number 11253 or the paired DKC serial number 11254 in the lock disk management table 1125. In the column of the lock disk ID 11265 of LDKs managing P/S, lock disk IDs which are codes for distinguishing the LDKs from each other are stored. The lock disk ID 11265 corresponds to the information on the LDK stored in the column of the management information 11247 in the external storage apparatus management table 1124.

In the column of the P/S type 11262, a P/S type is stored for each serial number 11261. The P/S type 11262 indicates whether the VDEV managed by the DKC 110 having the corresponding serial number 11261 is a P-VOL or a S-VOL. In the example of FIG. 18, "P" is stored when the VDEV managed by the DKC 110 having the corresponding serial number 11261 is the P-VOL, and "S" is stored when the VDEV is the S-VOL. In the column of the P/S type 11262, switching between "P" and "S" indicates that data I/O paths from the host apparatus 300 to the storage apparatuses 1 and 2 are changed.

In the column of the VDEV identification information 11263, codes for distinguishing the VDEVs managed by the DKC 110 having the corresponding serial number 11261 from each other are stored. A combination of the VDEV identification information 11263 specifies the P-VOL and the S-VOL which form the copy pair.

In the column of the pair status 11264, a state of each copy pair is stored according to the relationship between the pair status and the ownership described with reference to FIG. 11. In the example of FIG. 18, in the normal pair state, that is, the state where data I/O from the host apparatus 300 to the P-VOL and remote copy from the P-VOL to the S-VOL are normally executed, a "PAIR state" is stored. When the data I/O from the host apparatus 300 to the P-VOL is normal but there is trouble with the remote copy from the P-VOL to the S-VOL, a "SUSPEND state" which stops the remote copy process is stored.

When trouble occurs in the data I/O from the host apparatus 300 to the P-VOL, and the data I/O path is switched to the S-VOL side by the host apparatus 300, the remote copy controller 1122 on the S-VOL side which has received the data I/O sets the pair status on the S-VOL side to be a "SSWS state", thereby setting the own S-VOL to be able to receive data I/O of the host apparatus 300.

Furthermore, when the P-VOL and the S-VOL are switched by swap resync process to be described later, "P" and "S" in the column of the P/S type 11262 are switched and the "PAIR state" is stored in the column of the pair status 11264 as shown in the lowest row in FIG. 18.

In the column of the lock disk ID 11265, a lock disk ID that is an identification code of the LDK used to manage each copy pair is stored. This lock disk ID 11265 corresponds to the lock disk ID 11251 stored in the lock disk management table 1125.

Explanation of Process Flow in This Embodiment

Next, with reference to flowcharts, description will be given of process executed by the configuration of the storage system 1 according to this embodiment described above.

Lock Disk Registration Process

FIG. 19 shows an example of a lock disk registration process flow. The lock disk registration process is set by the manager operating the lock disk setting part 211 in the management apparatus 200 before operation of the storage system 1 is started.

First, the remote copy controller 1122 in the storage apparatus 1 receives a lock disk ID, a storage apparatus 1 serial number and a storage apparatus 2 serial number from the lock disk setting part 211 in the management apparatus 200 (S1801). Next, a vendor name, an apparatus name, a LDEV ID and a LDEV capacity are acquired as information on a LDEV from the external storage apparatus management table 1124 in the SM 112 (S1802).

The remote copy controller 1122 determines whether or not the LDEV to be registered is normal based on the LDEV information (S1803) and reads the LDEV information (S1805) when it is determined that the LDEV is normal (S1803, Yes). On the other hand, when the LDEV is determined as not normal (S1803, No), the remote copy controller 1122 terminates the process after notifying to display error (S1804).

Next, the remote copy controller 1122 determines whether or not the LDEV specified by the read LDEV information is used as a LDK (S1806). When it is determined that the LDEV is already used as the LDK, in other words, the LDEV is already registered as the LDK by the remote copy controller 1122 in the storage apparatus 2 (S1806, Yes), a lock disk ID, a storage apparatus 1 serial number and a storage apparatus 2 serial number, which are LDEV information on the LDEV, are compared with those described above (S1808). When it is determined that the information match (S1808, Yes), bit map information indicating that "the storage apparatus 1 is in use" is stored in LDK ID information in the external storage apparatus management table 1124 (S1810).

When it is determined that the information do not match (S1808, No), this means that the storage apparatus 1 having the LDEV to be used as the LDK does not match the information. Thus, the process is terminated after notifying an error (S 1809).

On the other hand, when it is determined that the LDEV is not used as the LDK (S1806, No), an LDK ID, the storage apparatus 1 serial number, the storage apparatus 2 serial number, an LDK information initial value (for example, bit map information having all bits set to 0) and the bit map information indicating that "the storage apparatus 1 is in use" are stored in the external storage apparatus management table 1124 (S1807). Next, it is determined whether or not the write into the external storage apparatus management table 1124 has been properly executed in S1807 (S1811). When it is determined that the write has been properly executed (S1811, Yes), the remote copy controller 1122 writes a LDK ID 11251, an own DKC (the DKC 110 in the storage apparatus 1) serial number 11253 and a paired DKC (the DKC 110 in the storage apparatus 2) serial number 11254 into the lock disk management table 1125 in the SM 112.

When it is determined that the write has not been properly executed in S1811 (S1811, No), the process is terminated after notifying an error (S1804).

Note that the LDK registration process flow described above with reference to FIG. 19 shows the case where the registration process is performed on the storage apparatus 1. By replacing the storage apparatus 1 with the storage apparatus 2 in FIG. 19, the process flow shown in FIG. 19 is switched to a LDK registration process flow on the storage apparatus 2.

The above configuration allows the storage apparatuses 1 and 2 to determine whether or not each of the apparatuses has the authority to receive data I/O of the host apparatus 300, and prevents unauthorized process when the apparatus does not have the ownership which is the authority to receive the data I/O based on the determination result.

Remote Copy Pair Creation Process

FIG. 20 shows a pair creation process flow for creating a remote copy pair by combining VDEVs included in the storage apparatuses 1 and 2.

First, the remote copy setting part 212 in the management apparatus 200 inputs, to the storage apparatus 1, a pair creation instruction including a VDEV ID on the P-VOL side (the storage apparatus 1 side), a VDEV ID on the S-VOL side (the storage apparatus 2 side), a serial number of the storage apparatus 2 that is the S-VOL side and a LDK ID (S1901).

The storage apparatus 1 stores the information inputted from the management apparatus 200 in S1901 in the copy pair management table 1126 set in the SM 112 (S1902), and transmits the same information to the storage apparatus 2 (S1903). The storage apparatus 2 stores the information received from the storage apparatus 1 in the copy pair management table 1126 set in its own SM 112 (S1904), and determines whether or not the VDEV matches its own VDEV based on the received information on the VDEV (S1905). This VDEV match determination process will be described later in connection with FIG. 21.

When it is determined in S1905 that the VDEV is identical to its own VDEV, the storage apparatus 2 transmits information on the determination result to the storage apparatus 1. Upon receipt of the information, the storage apparatus 1 uses the bit map information having all bits set to 0 to store information "NO OWNERSHIP" in the own DKC lock information in the LDK management table 1125 set in its own SM 112 (S1906). Accordingly, the VDEVs in the storage apparatuses 1 and 2 form the remote copy pair. Thereafter, the storage apparatus 1 terminates the process after copying all the data stored in its own CM 113 to the CM 113 in the storage apparatus 2 through the inter-DKC path (S1907).

The above configuration enables setting for executing remote copy process for a pair of the VDEVs associated with the same external storage apparatus 400.

VDEV Match Determination Process

FIG. 21 shows an example of a VDEV match determination process flow. The storage apparatus 2 refers to the external storage apparatus management table 1124 stored in its own SM 112 to determine whether or not vendor names 11242 and apparatus names 11243 related to VDEVs forming a remote copy pair match that of its own based on information on the VDEVs received from the storage apparatus 1 (S2001). When it is determined that the names match each other (S2001, Yes), the storage apparatus 2 further determines whether or not VDEV IDs 11244 and VDEV capacities 11245 match each other (S2003).

When it is determined that the IDs and the capacities match each other, the storage apparatus 2 determines that an LDEV specified by the storage apparatus 1 matches an LDEV associated with its own VDEV, and then terminates the process (S2004). When the it is determined that there is no match in S2001 or S2003 (S2001 or S2003, No), the storage apparatus 2 determines that the LDEV specified by the storage apparatus 1 is different from the LDEV associated with its own VDEV, and then terminates the process (S2002). In this case, the process may be immediately terminated after notifying an error, for example, without returning to the pair creation process shown in FIG. 20.

The above configuration enables setting for executing remote copy process for a pair of the VDEVs associated with the same external storage apparatus 400.

Process of Writing Data into Storage Apparatus 1

FIG. 22 shows an example of a flow of process of writing data into the storage apparatus 1 from the host apparatus 300. This process flow is the case in which data is written from the host apparatus 300 into the storage apparatus 1 on the P-VOL side. This process flow is executed by the remote copy controller 1122 in the DKC 110 of the storage apparatus 1.

First, it is determined whether or not data write destinations of data from the host apparatus 300 are VDEVs forming a copy pair (S2101). When it is determined that the data write destinations are VDEVs forming no copy pair (S2101, No), the remote copy controller 1122 writes data on received data I/O into its own CM 113, transmits information to that effect to the host apparatus 300 and then terminates the process (S2102 and S2103).

When it is determined in S2101 that the write destination VDEVs form the copy pair (S2101, Yes), it is determined whether or not the write destination VDEVs are P-VOLs (S2104). When it is determined that the write destination VDEVs are not the P-VOLs (S2104, No), the process moves to data write process for S-VOL to be described later.

When it is determined that the write destination VDEVs are the P-VOLs (S2104, Yes), the remote copy controller 1122 refers to the pair status 11264 in the own copy pair management table 1126 to determine whether or not a "PAIR state" indicating a normal pair status is stored (S2105). When it is determined that the pair status is not normal (S2105, No), the remote copy controller 1122 moves to S2102 to write data into the CM 113.

When it is determined that the pair status is normal (S2105, Yes), the remote copy controller 1122 writes the data received from the host apparatus 300 into the own CM 113, and transfers the data to the storage apparatus 2 through the inter-DKC path (S2106 and S2107). In the storage apparatus 2, the received data is written into its own CM 113, and information about a result thereof is transmitted to the storage apparatus 1 (S2108).

In the storage apparatus 1, it is determined whether or not the data is properly transferred based on the result information received from the storage apparatus 2 (S2109). When it is determined that the data is properly transferred (S2109, Yes), information to that effect is transmitted to the host apparatus 300, and then the process is terminated (S2103). When it is determined that the data is not properly transferred (S2109, No), the remote copy controller 1122 in the storage apparatus 1 writes, into the LDK, information indicating that the apparatus has the ownership (S2110), and also stores bit map information indicating the ownership in the own DKC lock information 11255 in the lock disk management table 1125 stored in the own SM 112 (S2111). Next, the remote copy controller 1122 performs suspend process of stopping the remote copy process with the S-VOL side, and stores information to that effect in the pair status 11264 in the own copy pair management table 1126 (S2112). Thereafter, the remote copy controller 1122 transmits information indicating that the data write is finished to the host apparatus 300, and then terminates the process (S2103).

The above configuration enables the storage apparatus 1 on the P-VOL side to solely process the data I/O of the host apparatus 300 by stopping the remote copy process when there is trouble with the remote copy process with the storage apparatus 2 on the S-VOL side.

Process of Reading Data from Storage Apparatus 1

FIG. 23 shows an example of a process flow of reading data from the storage apparatus 1 by the host apparatus 300.

First, the remote copy controller 1122 in the storage apparatus 1 determines whether or not data associated with a data read request from the host apparatus 300 is stored in its own CM 113 (S2201). When it is determined that the data is stored (S2201, Yes), the data is read from the CM 113 and transmitted to the host apparatus 300 (S2203). When it is determined that the data is not stored in the CM 113 (S2201, No), the data is read into the CM 113 from a corresponding LDEV (HDD 412) in the external storage apparatus 400 (S2202). Thereafter, the data is transmitted from the CM 113 to the host apparatus 300, and then the process is terminated.

The above configuration enables the host apparatus 300 to read the data from the P-VOL.

Process of Writing Data into Storage Apparatus 2

FIG. 24 shows an example of a process flow of writing data from the host apparatus 300 into the storage apparatus 2. This process flow is the case in which data is written from the host apparatus 300 into the storage apparatus 2 on the S-VOL side. Execution of this process flow means that the data write request to the storage apparatus 1 on the P-VOL side has not been properly processed. This process flow is executed by the remote copy controller 1122 in the DKC 110 of the storage apparatus 2.

First, it is determined whether or not data write destinations from the host apparatus 300 are VDEVs forming a copy pair (S2301). When it is determined that the data write destinations are VDEVs forming no copy pair (S2301, No), the remote copy controller 1122 writes data on received data I/O into its own CM 113, and transmits information to that effect to the host apparatus 300 (S2310 and S2311). Next, the remote copy controller 1122 executes swap resync process of replacing the P-VOL and the S-VOL with each other by switching the P/S type 11262 in the copy pair management table 1126, and then terminates the process. A detailed flow of the swap resync process will be described later with reference to related drawings.

In S2301, when it is determined that the write destination VDEV forms the copy pair (S2301, Yes), it is determined whether or not the write destination VDEV is S-VOL (S2302). When it is determined that the write destination VDEV is not the S-VOL (S2302, No), the process moves to data write process for the P-VOL described above by the storage apparatus 1.

When it is determined that the write destination VDEV is the S-VOL (S2302, Yes), the remote copy controller 1122 refers to the own DKC lock information 11255 in the own LDK management table 1125 to determine which one of the P-VOL and the S-VOL has the ownership (S2303). When it is determined that the S-VOL has the ownership (S2303, S-VOL), the remote copy controller 1122 writes data associated with the data write request into the CM 113 (S2310), and transmits information indicating completion of the write to the host apparatus 300 (S2311). Next, the process moves to the swap resync process described above.

When it is determined that the P-VOL has the ownership (S2303, P-VOL), the remote copy controller 1122 transmits information indicating that the data write request cannot be accepted to the host apparatus 300 (S2307), and then moves to the swap resync process.

When it is determined in S2303 that the ownership is not stored, the remote copy controller 1122 reads data in the LDK (S2304) and determines whether or not the P-VOL has the ownership (S2305). When it is determined that the P-VOL has the ownership (S2305, Yes), the remote copy controller 1122 transmits information indicating that the data write request cannot be accepted to the host apparatus 300 (S2307) and then moves to the swap resync process.

When it is determined that the P-VOL does not have the ownership (S2305, No), the remote copy controller 1122 writes ownership information into the LDK in order to acquire the ownership (S2306). Next, the remote copy controller 1122 stores bit map information indicating that the apparatus has the ownership information in the own DKC lock information 11255 in the LDK management table 1125 stored in the own SM 112 (S2308). Thereafter, the remote copy controller 1122 further records information indicating that the pair status is the "SSWS state" in the pair state 11264 in the copy pair management table 1126 (S2309), writes the data related to the data write request into the own CM 113 (S2310) and transmits information indicating completion of the write to the host apparatus 300 (S2311). Next, the process moves to the swap resync process described above.

The above configuration enables the storage apparatus 2 on the S-VOL side to process the data I/O of the host apparatus 300 only when it is determined that the apparatus has the ownership. Thus, data inconsistency with the CM 113 on the P-VOL side is prevented.

(Process of Reading Data from Storage Apparatus 2)

FIG. 25 shows an example of a process flow of reading data from the storage apparatus 2 by the host apparatus 300.

First, it is determined whether or not data read destinations of the host apparatus 300 are VDEVs forming a copy pair (S2401). When it is determined that the data read destinations are VDEVs forming no copy pair (S2401, No), the remote copy controller 1122 in the storage apparatus 2 determines whether or not data associated with a data read request from the host apparatus 300 is stored in its own CM 113 (S2407). When it is determined that the data is stored (S2407, Yes), the data is read from the CM 113, and transmitted to the host apparatus 300 (S2409). When it is determined that the data is not stored in the CM 113 (S2407, No), the data is read into the CM 113 from a corresponding LDEV (HDD 412) in the external storage apparatus 400 (S2408). Thereafter, the data is transmitted to the host apparatus 300 from the CM 113, and then the process is terminated (S2409).

When it is determined in S2401 that the read destination VDEVs form the copy pair (S2401, Yes), it is determined whether or not the read destination VDEV is S-VOL (S2402). When it is determined that the read destination VDEV is not the S-VOL (S2402, No), the process moves to data read process from the P-VOL performed by the storage apparatus 1, as described above.

When it is determined that the read destination VDEV is the S-VOL (S2402, Yes), the remote copy controller 1122 refers to the pair status 11264 in the own copy pair management table 1126 to determine whether or not the pair status is normal (S2403). When it is determined that the pair status is not normal (S2403, No), the remote copy controller 1122 transmits information indicating that the data read request cannot be accepted to the host apparatus 300 since there is a possibility that the data stored in the own CM 113 is not properly updated (S2406).

When it is determined in S2403 that the pair state is normal (S2403, Yes), the remote copy controller 1122 reads data in the LDK (S2404), and determines whether or not the P-VOL has the ownership (S2405). When it is determined that the P-VOL has the ownership (S2405, Yes), the remote copy controller 1122 transmits information indicating that the data read request cannot be accepted to the host apparatus 300, and then terminates the process (S2406).

When it is determined that the P-VOL does not have the ownership (S2405, No), the remote copy controller 1122 executes the process starting from S2407, and then terminates the process.

The above configuration enables the storage apparatus 2 on the S-VOL side to process the data I/O of the host apparatus 300 only when the apparatus has the ownership. Thus, the host apparatus 300 is prevented from accidentally reading incorrect data.

A host apparatus with a certain kind of an OS installed transmits a data read request to a storage apparatus when rebooting the host apparatus. According to the above-described configuration, even if the host apparatus 300 transmits a data read request to the storage apparatus 2 on the S-VOL side when rebooting, the storage apparatus 2 on the S-VOL side does not write ownership information into the LDK, but only determines that the storage apparatus 1 on the P-VOL side does not have ownership (S2405). Therefore, the storage apparatus 2 on the S-VOL side does not acquire the ownership improperly when the storage apparatus 2 on the S-VOL side receives the data read request when rebooting the host apparatus 300.

Suspend Process By Storage Apparatus 1

FIG. 26 shows an example of a remote copy pair suspend process flow by the storage apparatus 1. This suspend process is executed in S2112 in the data write request process flow (FIG. 21) for the storage apparatus 1.

First, the remote copy controller 1122 in the storage apparatus 1 transmits a S-VOL suspend request to the remote copy controller 1122 in the storage apparatus 2 through the inter-DKC path (S2501). Upon receipt of the request, the remote copy controller 1122 in the storage apparatus 2 stores "SUSPEND" in the pair status 11264 in the copy pair management table 1126 stored in the own SM 112, and transmits information to that effect to the storage apparatus 1. Upon receipt of the information, the remote copy controller 1122 in the storage apparatus 1 stores "SUSPEND" in the pair status 11264 in the copy pair management table 1126 stored in the own SM 112 (S2503), and transmits information for setting ownership information in the LDK to the external storage apparatus 400 registered as the LDK (S2504).

Upon receipt of the ownership information setting request, the external storage apparatus 400 writes the ownership information on the storage apparatus 1 on the P-VOL side into the LDK (S2505), and transmits, to the storage apparatus 1, information indicating that the ownership information setting is completed. Upon receipt of the information, the remote copy controller 1122 in the storage apparatus 1 stores bit map information in the own DKC lock information 11255 in the lock disk management table 1125 stored in the own SM 112, the information indicating that the ownership is acquired (S2506).

The above configuration enables the storage apparatus 1 on the P-VOL side to process the data I/O of the host apparatus 300 while stopping the remote copy process between the storage apparatus 1 on the P-VOL side and the storage apparatus 2 on the S-VOL side when data cannot be transferred from the storage apparatus 1 to the storage apparatus 2.

Destage Process by Storage Apparatus 1 on P-VOL Side

FIG. 27 shows an example of a destage process flow from the storage apparatus 1 on the P-VOL side.

First, in order to destage data stored in its own CM 113, the remote copy controller 1122 in the storage apparatus 1 makes a write request by reading and transferring the data to the external storage apparatus 400 providing a LDEV associated with the own VDEV (S2601). Upon receipt of the write request, the external storage apparatus 400 writes the data into the HDD 421 and transmits the result to the storage apparatus 1 (S2602).

The storage apparatus 1 determines whether or not the write in the external storage apparatus 400 has been successful (S2603). When it is determined that the write has been successful (S2603, Yes), the storage apparatus 1 deletes the data stored in its own CM 113, and transmits, to the storage apparatus 2, a request to delete the data in the CM 113 of storage the apparatus 2(S2605). Upon receipt of the request to delete the data in the CM 113, the storage apparatus 2 deletes the data stored in its own CM 113 and then terminates the process (S2606).

When it is determined in S2603 that the data write into the external storage apparatus 400 has not been successful (S2603, No), the storage apparatus 1 retries a predetermined number of write requests to the external storage apparatus 400, and then terminates the process after closing the own VDEV to which the data in the CM 113 cannot be destaged (S2607).

The above configuration enables the storage apparatus 1 on the P-VOL side to release the storage area of the CM 113 in the storage apparatus 2 on the S-VOL side by deleting the data therein in synchronization with the destage process for the data stored in the own CM 113.

Destage Process by Storage Apparatus 2 on S-VOL Side

FIG. 28 shows an example of a destage process flow from the storage apparatus 2 on the S-VOL side.

First, in order to destage the data stored in the CM 113 in the storage apparatus 2, the remote copy controller 1122 in the storage apparatus 1 transmits, to the remote copy controller 1122 in the storage apparatus 2, a destage request to transfer the data stored in the CM 113 in the storage apparatus 2 to the external storage apparatus 400 providing a LDEV associated with a VDEV in the storage apparatus 2 through the inter-DKC path (S2701).

Upon receipt of the destage request, the remote copy controller 1122 in the storage apparatus 2 makes a write request by reading the data in the own CM 113 and transferring the data to the external storage apparatus 400 (S2702). Upon receipt of the write request, the external storage apparatus 400 writes the data into the HDD 421, and transmits the result to the storage apparatus 2 (S2703).

The storage apparatus 2 determines whether or not the write in the external storage apparatus 400 has been successful (S2704). When it is determined that the write has been successful (S2704, Yes), the storage apparatus 2 deletes the data stored in its own CM 113 and transmits, to the storage apparatus 1, information indicating that the destage is properly finished (S2705). Upon receipt of the information indicating that the destage is properly finished in the storage apparatus 2, the storage apparatus 1 deletes the data stored in the own CM 113 and then terminates the process (S2706).

When it is determined in S2704 that the data write into the external storage apparatus 400 has not been successful (S2704, No), the storage apparatus 2 retries a predetermined number of write requests to the external storage apparatus 400, and then transmits information indicating that the data in the CM 113 cannot be destaged to the storage apparatus 1. Upon receipt of the information, the storage apparatus 1 terminates the process after closing its own VDEV to which the data in the CM 113 cannot be destaged (S2707).

The above configuration enables the storage apparatus 1 on the P-VOL side to release the storage area of its own CM 113 by deleting the data therein in synchronization with the destage process for the data stored in the CM 113 in the storage apparatus 2 on the S-VOL side.

Swap Resync Process

FIG. 29 shows an example of a swap resync process flow according to this embodiment. This swap resync process is for shifting from a SSWS state where the S-VOL has the ownership and processes the data I/O of the host apparatus 300 to a pair state where a copy pair is created between the own VDEV and the VDEV in the storage apparatus 1 on the P-VOL side again and the apparatus currently set as the S-VOL is set to be the P-VOL to process the data I/O of the host apparatus 300.

First, the remote copy controller 1122 in the storage apparatus 2 currently on the S-VOL side makes an inquiry about whether or not a data I/O path between the host apparatus 300 and the storage apparatus 1 on the P-VOL side is normal to the path management controller 312 in the host apparatus 300 through the communication network N2 (S2801). When it is determined that the data I/O path is not normal (S2801, No), the process is immediately terminated. In this event, information indicating that "swap resync process" cannot be executed may be outputted through the output unit 15 in the host apparatus 300.

When it is determined that the data I/O path between the host apparatus 300 and the storage apparatus 1 on the P-VOL side is normal (S2801, Yes), the remote copy controller 1122 in the storage apparatus 2 switches the P/S type 11262 stored in the copy pair management table 1126 stored in the own SM 112 with that in the storage apparatus 1 (S2802). Thereafter, the remote copy controller 1122 requests the remote copy controller 1122 in the storage apparatus 1 to perform the same process of switching the P/S type 11262 through the inter-DKC path.

Upon receipt of the request from the storage apparatus 2, the remote copy controller 1122 in the storage apparatus 1 switches the P/S type 11262 stored in the copy pair management table 1126 stored in the own SM 112 with that in the storage apparatus 2 (S2804) and deletes the data stored in the own CM 113 (S2805). Next, the remote copy controller 1122 transmits, to the remote copy controller 1122 in the storage apparatus 2, information on the result of the process of switching the P/S type 11262.

Upon receipt of the switching result information from the storage apparatus 1, the remote copy controller 1122 in the storage apparatus 2 determines whether or not the switching has been properly executed and whether or not the own VDEV is normal. When it is determined that the switching has been properly executed and the VDEV is normal (S2806, Yes), the remote copy controller 1122 stores information "no ownership" in the LDK (S2807). When it is determined that the switching has not been properly executed or the VDEV is not normal (S2806, No), the remote copy controller 1122 performs remote copy process by executing the pair suspend process shown in FIG. 25, and solely performs its operations as the S-VOL.

The remote copy controller 1122 in the storage apparatus 2 copies all the data stored in its own CM 113 to the CM 113 in the storage apparatus 1 through the inter-DKC path (S2808).

At this point, a copy pair is newly formed with the VDEV in the storage apparatus 2 as the P-VOL and the VDEV in the storage apparatus 1 as the S-VOL. Thus, the remote copy controller 1122 in the storage apparatus 2 stores the "PAIR state" indicating that there is a normal copy pair in the pair status 11264 in the own copy pair management table 1126, and then terminates the process (S2809).

According to the above configuration, in the case where the data I/O process in the storage apparatus 1 on the P-VOL side is stopped once and then data I/O is transmitted from the host apparatus 300 to the storage apparatus 2 on the S-VOL side, the remote copy process can be restarted by switching the P-VOL and the S-VOL if the problem in the storage apparatus 1 on the P-VOL side has been solved.

Cache Data Asynchronous Full Copy Process

FIG. 30 shows an example of a cache data asynchronous full copy process flow. This cache data asynchronous full copy process is one of initialization process in the case of creating a copy pair between VDEVs in two storage apparatuses, respectively, and is executed in S1907 in the copy pair creation process shown in FIG. 19, for example.

First, in order to copy the data stored in the CM 113 in the storage apparatus 100 on the P-VOL side to the CM 113 in the storage apparatus 100 on the S-VOL side, the remote copy controller 1122 in the storage apparatus 100 on the P-VOL side transmits the stored data to the storage apparatus 100 on the S-VOL side through the inter-DKC path (S2901). Upon receipt of the data from the storage apparatus 100 on the P-VOL side, the remote copy controller 1122 in the storage apparatus 100 on the S-VOL side writes the received data into the own CM 113 (S2902) and transmits the write result to the storage apparatus 100 on the P-VOL side.

Upon receipt of the write result in the storage apparatus 100 on the S-VOL side, the remote copy controller 1122 in the storage apparatus 100 on the P-VOL side determines whether or not the data in the own CM 113 has been properly copied to the storage apparatus 100 on the S-VOL side. When it is determined that the data has been properly copied (S2903, Yes), the data remaining in the CM 113 is continuously transferred to the storage apparatus 100 on the S-VOL side (S2904, No). When it is determined that all the data stored in the own CM 113 has been copied (S2904, Yes), the remote copy controller 1122 stores the "PAIR state" indicating that there is a normal copy pair in the pair status 11264 in the own copy pair management table 1126 and then terminates the process (S2905).

When it is determined in S2903 that the data copy has not been properly executed (S2903, No), the remote copy controller 1122 on the P-VOL side stops remote copy process by executing the pair suspend process shown in FIG. 26 and solely performs its operations as the P-VOL (S2906).

According to the above configuration, since the data stored in the CMs 113 in the storage apparatus 1 on the P-VOL side and the data stored in the storage apparatus 2 on the S-VOL side coincide with each other before start of the remote copy process, the host apparatus 300 can effectively utilize the data in the CM 113 even after the data I/O process request destination in the host apparatus 300 is changed from the storage apparatus 1 on the P-VOL side to the storage apparatus 2 on the S-VOL side.

As described in detail above, the storage system 1 according to this embodiment provides a storage system and a method for controlling a storage system, which enable more efficient and effective utilization of storage areas provided by a storage apparatus.

The invention claimed is:

1. A storage system including
a first storage apparatus;
a second storage apparatus; and
a data I/O process authority information storage unit,
the first and second storage apparatuses being communicatively coupled to an external apparatus,
the first and second storage apparatuses respectively having: first and second storage areas selectively accessible from the external apparatus to store data of the external apparatus; first and second temporary storage areas temporarily storing input/output data of the first and second storage areas; and remote copy controllers configured to control data copy process between the first and second storage areas and between the first and second temporary storage areas,
the first and second storage areas being formed by having a logical device allocated thereto in a virtual manner, the logical device being created from at least one physical storage medium provided in a third storage apparatus communicatively coupled to the first and second storage apparatuses, and
the data I/O process authority information storage unit storing data I/O process authority information indicating to which one of the first and second storage areas the authority to process data I/O of the external apparatus is provided,
wherein the remote copy controller in any one of the first and second storage apparatuses reads the data I/O process authority information stored in the data I/O process authority information storage unit and copies, to the other storage apparatus, data stored either in the first storage area and the first temporary storage area, or in the second storage area and the second temporary storage area that are included in the one of the first and second storage apparatuses to which the remote copy controller belongs, when the remote copy controller determines that the data I/O process authority information is not recorded and that the own storage apparatus has a primary logical device in remote copy control.

2. The storage system according to claim 1, wherein
the data I/O process authority information storage unit is a storage area included in a fourth external storage apparatus communicatively coupled to the first and second storage apparatuses, and
the remote copy controller in any one of the first and second storage apparatuses reads the data I/O process authority information stored in the storage area of the fourth external storage apparatus and copies, to the other storage apparatus, data stored either in the first storage area and the first temporary storage area, or in the second storage area and the second temporary storage area that are included in the one of the first and second storage apparatuses to which the remote copy controller belongs, when the remote copy controller determines that the data I/O process authority information is not recorded and that the storage area in the own storage apparatus is the primary logical device in remote copy control.

3. The storage system according to claim 1, wherein
upon receipt of a request to set the data I/O process authority information storage unit, the remote copy controller in any one of the first and second storage apparatuses determines whether or not the data I/O process authority information storage unit is already set, when the remote copy controller determines that the data I/O process authority information storage unit is yet to be set, the remote copy controller records, in a storage area included in a predetermined external storage apparatus, predetermined identification information on the one of the storage apparatuses to which the remote copy controller belongs, identification information on the other storage apparatus and identification information for identifying the external storage apparatus, and when the remote copy controller determines that the data I/O process authority information storage unit is already set, the remote copy controller reads the predetermined identification information on the storage apparatuses and identification information included in the external storage apparatus to check if the information matches the data I/O process authority information storage unit used by the remote copy controller.

4. The storage system according to claim 1, wherein
upon receipt of a data I/O request from the external apparatus, the remote copy controller in any one of the first and second storage apparatuses reads the data I/O process authority information stored in the data I/O process authority information storage unit and accepts the data I/O request when the remote copy controller determines that the data I/O process authority information is not recorded and that the own storage apparatus has the primary logical device in remote copy control.

5. The storage system according to claim 1, wherein
upon receipt of a data I/O request from the external apparatus, the remote copy controller in any one of the first and second storage apparatuses writes data into its own temporary storage area, transfers the same data to the temporary storage area in the other storage apparatus, and stops remote copy process for the other storage apparatus when the remote copy controller determines that the transfer is not properly executed.

6. The storage system according to claim 1, wherein
when the remote copy controller in any one of the first and second storage apparatuses receives a data I/O request from the external apparatus, and determines that the own storage apparatus has a secondary logical device in remote copy control, the remote copy controller executes setting change process for setting the storage area in the own storage apparatus as a primary logical device, and requests the remote copy controller in the other storage apparatus to set the storage area in the other storage apparatus as the secondary logical device.

7. The storage system according to claim 1, wherein
when the remote copy controller in any one of the first and second storage apparatuses belongs to the storage apparatus which has the primary logical device in remote copy control, the remote copy controller executes any one of a process of destaging data stored in its own temporary storage area to the storage area in the external storage apparatus, and a process of requesting the remote copy controller in the other storage apparatus to destage the data, stored in the temporary storage area belonging to the other storage apparatus, to the storage area in the external storage apparatus.

8. The storage system according to claim 1, further comprising
a management apparatus communicatively coupled to the first and second storage apparatuses, the external storage apparatus and the data I/O process authority information storage unit, wherein the management apparatus includes
a remote copy setting unit configured to set the first storage area in the first storage apparatus and the second storage area in the second storage apparatus as a pair for remote copy control, and
a data I/O process authority information storage unit setting unit configured to request any one of the first and second storage apparatuses to set the data I/O process authority information storage unit.

9. A storage system control method for controlling a storage system including a first storage apparatus and a second storage apparatus which are communicatively coupled to an external apparatus, the first and second storage apparatuses respectively having: first and second storage areas selectively accessible from the external apparatus to store data of the external apparatus; first and second temporary storage areas temporarily storing input/output data of the first and second storage areas; and a remote copy controllers configured to control data copy process between the first and second storage areas and between the first and second temporary storage areas, the first and second storage areas being formed by having a logical device allocated thereto in a virtual manner, the logical device being generated from at least one physical storage medium provided in a third storage apparatus communicatively coupled to the first and second storage apparatuses, and a data I/O process authority information storage unit storing data I/O process authority information indicating to which one of the first and second storage areas the authority to process data I/O of the external apparatus is provided, the method comprising:

the remote copy controller in any one of the first and second storage apparatuses reading the data I/O process authority information stored in the data I/O process authority information storage unit; and the remote copy controller copying, to the other storage apparatus, data stored either in the first storage area and the first temporary storage area, or in the second storage area and the second temporary storage area that are included in the one of the first and second storage apparatuses to which the remote copy controller belongs, when the remote copy controller determines that the data I/O process authority information is not recorded and that the own storage apparatus has a primary logical device in remote copy control.

10. The storage system control method according to claim 9, further comprising:

upon receipt of a request to set the data I/O process authority information storage unit, the remote copy controller in any one of the first and second storage apparatuses determining whether or not the data I/O process authority information storage unit is already set;

when the remote copy controller determines that the data I/O process authority information storage unit is yet to be set, the remote copy controller recording, in a storage area included in a predetermined external storage apparatus, predetermined identification information on one of the storage apparatuses to which the remote copy controller belongs, identification information on the other storage apparatus and identification information for identifying the external storage apparatus; and when the remote copy controller determines that the data I/O process authority information storage unit is already set, the remote copy controller reading the predetermined identification information on the storage apparatuses and identification information included in the external storage apparatus to check if the information matches the data I/O process authority information storage unit used by the remote copy controller.

11. The storage system control method according to claim 9, further comprising upon receipt of a data I/O request from the external apparatus, the remote copy controller in any one of the first and second storage apparatuses reading the data I/O process authority information stored in the data I/O process authority information storage unit and accepting the data I/O request when the remote copy controller determines that the data I/O process authority information is not recorded and that the own storage apparatus has the primary logical device in remote copy control.

12. The storage system control method according to claim 9, further comprising upon receipt of a data I/O request from the external apparatus, the remote copy controller in any one of the first and second storage apparatuses writing data into its own temporary storage area, transferring the same data to the temporary storage area in the other storage apparatus, and stopping remote copy process for the other storage apparatus when the remote copy controller determines that the transfer is not properly executed.

13. The storage system control method according to claim 9, further comprising when the remote copy controller in any one of the first and second storage apparatuses receives a data I/O request from the external apparatus, and determines that the own storage apparatus has a secondary logical device in remote copy control, the remote copy controller executing setting change process for setting the own storage apparatus as a primary logical device, and requesting the remote copy controller in the other storage apparatus to set the storage area in the other storage apparatus as the secondary logical device.

14. The storage system control method according to claim 9, further comprising when the remote copy controller in any one of the first and second storage apparatuses belongs to the storage apparatus which has the primary logical device in remote copy control, the remote copy controller executing any one of a process of destaging data stored in its own temporary storage area to the storage area in the external storage apparatus, and a process of requesting the remote copy controller in the other storage apparatus to destage the data, stored in the temporary storage area belonging to the other storage apparatus, to the storage area in the external storage apparatus.

15. The storage system control method according to claim 9, wherein the storage system further includes
a management apparatus communicatively coupled to the first and second storage apparatuses, the external storage apparatus and the data I/O process authority information storage unit, and
the management apparatus includes:
a remote copy setting unit configured to set the first storage area in the first storage apparatus and the second storage area in the second storage apparatus as a pair for remote copy control; and
a data I/O process authority information storage unit setting unit configured to request any one of the first and second storage apparatuses to set the data I/O process authority information storage unit.

* * * * *